(12) United States Patent
Yokoyama et al.

(10) Patent No.: US 7,064,470 B2
(45) Date of Patent: Jun. 20, 2006

(54) THREE-PHASE MOTOR

(75) Inventors: Takeshi Yokoyama, Anjo (JP);
Yoshiyuki Kawasaki, Anjo (JP);
Shingo Hashimoto, Anjo (JP); Tooru Kuroyanagi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/848,121

(22) Filed: May 19, 2004

(65) Prior Publication Data

US 2004/0256942 A1    Dec. 23, 2004

(30) Foreign Application Priority Data

| May 20, 2003 | (JP) | ............................. 2003-142495 |
| Sep. 9, 2003 | (JP) | ............................. 2003-317241 |
| Sep. 9, 2003 | (JP) | ............................. 2003-317242 |

(51) Int. Cl.
*H02K 3/46* (2006.01)

(52) U.S. Cl. ....................... 310/260; 310/208

(58) Field of Classification Search ................ 310/260, 310/201–208, 180, 184
See application file for complete search history.

(56) References Cited

U.S. PATENT DOCUMENTS 6,011,339 A * 1/2000 Kawakami .................. 310/208
6,787,961 B1 * 9/2004 Neet et al. .................. 310/201

FOREIGN PATENT DOCUMENTS

JP    U 5-78177    10/1993

* cited by examiner

*Primary Examiner*—Dang Le
(74) *Attorney, Agent, or Firm*—Oliff & Berridge, PLC

(57) ABSTRACT

A three-phase motor having a stator in which the dimensions of protrusion of coil end parts in winding coils of individual phases can be equalized as much as possible and in which the overall dimension of protrusion of the coil end parts in the winding coils of the three phases can be reduced to an optimal dimension is provided. Each of unipolar coils forming the winding coils of the three phases has a pair of coil end parts protruding from end parts in the axial direction of a stator core. The winding coils of the three phases have the relationships of Cv/Cu=0.88 to 0.98 and Cw/Cv=0.88 to 0.98, where Cu, Cv, Cw represent average lengths of electric wires forming the coil end parts in the three phases of U-phase, V-phase and W-phase.

20 Claims, 11 Drawing Sheets

THREE-PHASE MOTOR

BACKGROUND OF THE INVENTION

This application claims priority from JP 2003-317241 filed Sep. 9, 2003; JP 2003-317242 filed Sep. 9, 2003, and JP 2003-142495 filed May 20, 2003, the disclosures of which are incorporated in their entireties herein.

1. Field of Invention

This invention relates to a three-phase motor having a stator formed by inserting winding coils of three phases into slots provided on the inner circumferential surface of a stator core.

2. Description of Related Art

A stator, used for a three-phase motor, is formed by sequentially inserting winding coils of U-phase, V-phase and W-phase into many slots formed on the inner circumferential surface of the stator core.

A distributed winding type stator is known in which plural unipolar coils, formed by winding electric wires in plural turns and connected via a connecting wire, are used as the winding coil of each phase, and in which the unipolar coils of the winding coil of each phase are inserted in a distributed manner in many slots.

In the above-described distributed winding type stator, each unipolar coil of the winding coil of V-phase is offset with respect to each unipolar coil of the winding coil of U-phase and each unipolar coil of the winding coil of W-phase is offset with respect to each unipolar coil of the winding coil of V-phase in a circumferential direction by a predetermined number of slots, and each of these coils is thus inserted in each slot on the stator core. The remaining part of each unipolar coil of the winding coil of each phase that is not inserted in each slot protrudes from an end part in the axial direction of the stator core and forms a coil end part of each phase.

In a stator 92, as shown in FIG. 12, unipolar coils 931, 941, 951 of winding coils 93, 94, 95 of U-phase, V-phase and W-phase have substantially the same circumferential length.

Meanwhile, at coil end parts 932, 942, 952 of the phases, the coil end part 942 of V-phase is superposed on the inner circumferential side of the coil end part 932 of U-phase, and the coil end part 952 of W-phase is superposed on the inner circumferential side of the coil end part 942 of V-phase, as shown in FIG. 13. Therefore, to insert the winding coil 94 of V-phase into a stator core 921, the coil end part 932 of U-phase must be deformed and shifted toward the outer circumferential side of the stator core 921. Moreover, to insert the winding coil 95 of W-phase into the stator core 921, the coil end part 942 of V-phase must be deformed and shifted toward the outer circumferential side of the stator core 921.

Therefore, the coil end parts 932, 942, 952 of the above-described phases have the following shapes. That is, the coil end part 942 of V-phase protrudes from an end (side of the ring like stator) part 922 in the axial direction of the stator core 921 to a greater degree than the coil end part 932 of U-phase, and the coil end part 952 of W-phase protrudes from the end part 922 in the axial direction of the stator core 921 to a greater degree than the coil end part 942 of V-phase. This makes it difficult to reduce the overall dimensions of the coil end parts 932, 942, 952 of the three phases.

In a stator used for a single-phase motor, as described in JP-UM-A-5-78177, the circumferential length of a winding arranged on the inner circumferential side of a stator core is made shorter than the circumferential length of a winding arranged on the outer circumferential side and a sag at the coil end part is thus reduced to decrease the size of the coil end part.

However, in the three-phase motor, it is important to deform and shift the coil end parts 932, 942 of U-phase and V-phase toward the outer circumferential side of the stator core 921 by an optimum quantity. To this end, it is necessary to optimize the ratio of the lengths of the electric wires forming the coil end parts 932, 942, 952 of U-phase, V-phase and W-phase. Therefore, the technique of JP-UM-A-5-78177 cannot be directly applied to the three-phase motor.

SUMMARY OF THE INVENTION

In view of the foregoing problem of the conventional technique, it is an object of this invention to provide a three-phase motor having a stator in which the dimensions of protrusion of coil end parts of the winding coils of the three phases can be made as equal as possible and in which the overall dimension of the protrusion of the coil end parts of the winding coils of the three phases can be reduced to an optimum dimension.

In view of the foregoing problem in the conventional technique, it is another object of this invention to provide a three-phase motor having a stator in which the overall dimension of the coil end parts of the winding coils of the three phases can be reduced without generating any difference in the conductor resistance of the winding coils of the three phases if possible.

According to a first form of the invention, in a three-phase motor having a stator formed by sequentially inserting winding coils of the three phases of U-phase, V-phase and W-phase into slots provided on an inner circumferential surface of a stator core, the winding coil of each phase is formed by connecting plural unipolar coils formed by winding electric wires in plural turns, and each of the unipolar coils includes a pair of insertion parts to be inserted into the slots and a pair of coil end parts connecting the pair of insertion parts.

The winding coils of the three phases are related as Cv/Cu=0.88 to 0.98 and Cw/Cv=0.88 to 0.98, where Cu represents an average length of the electric wires forming the coil end parts of each of the unipolar coils in the winding coil of U-phase, Cv represents an average length of the electric wires forming the coil end parts of each of the unipolar coils in the winding coil of V-phase, and Cw represents an average length of the electric wires forming the coil end parts of each of the unipolar coils in the winding coil of W-phase.

In the three-phase motor of this form of the invention, the stator is so devised that the ratio of the average lengths of the electric wires forming the coil end parts of each of the unipolar coils in the winding coils of the three phases are optimized between U-phase, V-phase and W-phase. That is, in this invention, the average lengths Cu, Cv, Cw of the electric wires forming the coil end parts of the winding coils of the three phases are related as Cu>Cv>Cw.

According to a second form of the invention, in a three-phase motor having a stator formed by inserting winding coils of three phases of U-phase, V-phase and W-phase into slots provided on an inner circumferential surface of a stator core, the winding coil of each phase has plural unipolar coils formed by winding electric wires in plural turns, a connecting wire for connecting the unipolar coils, and a pair of lead parts formed by leading out the electric wires from the unipolar coils situated at both ends of the plural unipolar coils, and each of the unipolar coils includes a pair of insertion parts to be inserted into the slots and a pair of coil end parts connecting the pair of insertion parts.

With respect to average circumferential lengths of the unipolar coils in the winding coils of the three phases, the average circumferential length in the winding coil of V-phase is shorter than the average circumferential length in the winding coil of U-phase, and the average circumferential length in the winding coil of W-phase is shorter than the average circumferential length in the winding coil of V-phase.

The pair of insertion parts of the winding coil of U-phase is inserted in the slots and the pair of coil end parts of the winding coil of U-phase protrudes from end parts in an axial direction of the stator core.

The pair of insertion parts of the winding coil of V-phase is offset from the winding coil of U-phase by a predetermined number of slots in a first direction, which is one circumferential direction of the stator core, as they are inserted in the slots, and the pair of coil end parts of the winding coil of V-phase is partly superposed on an inner circumferential side of the pair of coil end parts of the winding coil of U-phase.

The pair of insertion parts of the winding coil of W-phase is offset from the winding coil of V-phase by a predetermined number of slots in the first direction of the stator core as they are inserted in the slots, and the pair of coil end parts of the winding coil of W-phase is partly superposed on an inner circumferential side of the pair of coil end parts of the winding coil of V-phase.

Of the pair of lead parts of the winding coil of each phase, the lead part situated at an end part in a second direction, which is opposite to the first direction of the stator core, is used as a neutral point side lead part. The neutral point side lead parts of the winding coils of the three phases are bundled to form a neutral point at a position where an offset from the winding coil of U-phase by a predetermined angle in the second direction is made, so that the neutral point side lead part of the winding coil of V-phase is longer than the neutral point side lead part of the winding coil of U-phase, and the neutral point side lead part of the winding coil of W-phase is longer than the neutral point side lead part of the winding coil of V-phase.

BRIEF DESCRIPTION OF THE DRAWINGS

The invention will be described with reference to the drawings, in which.

DETAILED DESCRIPTION OF PREFERRED EMBODIMENTS

Figure 1:
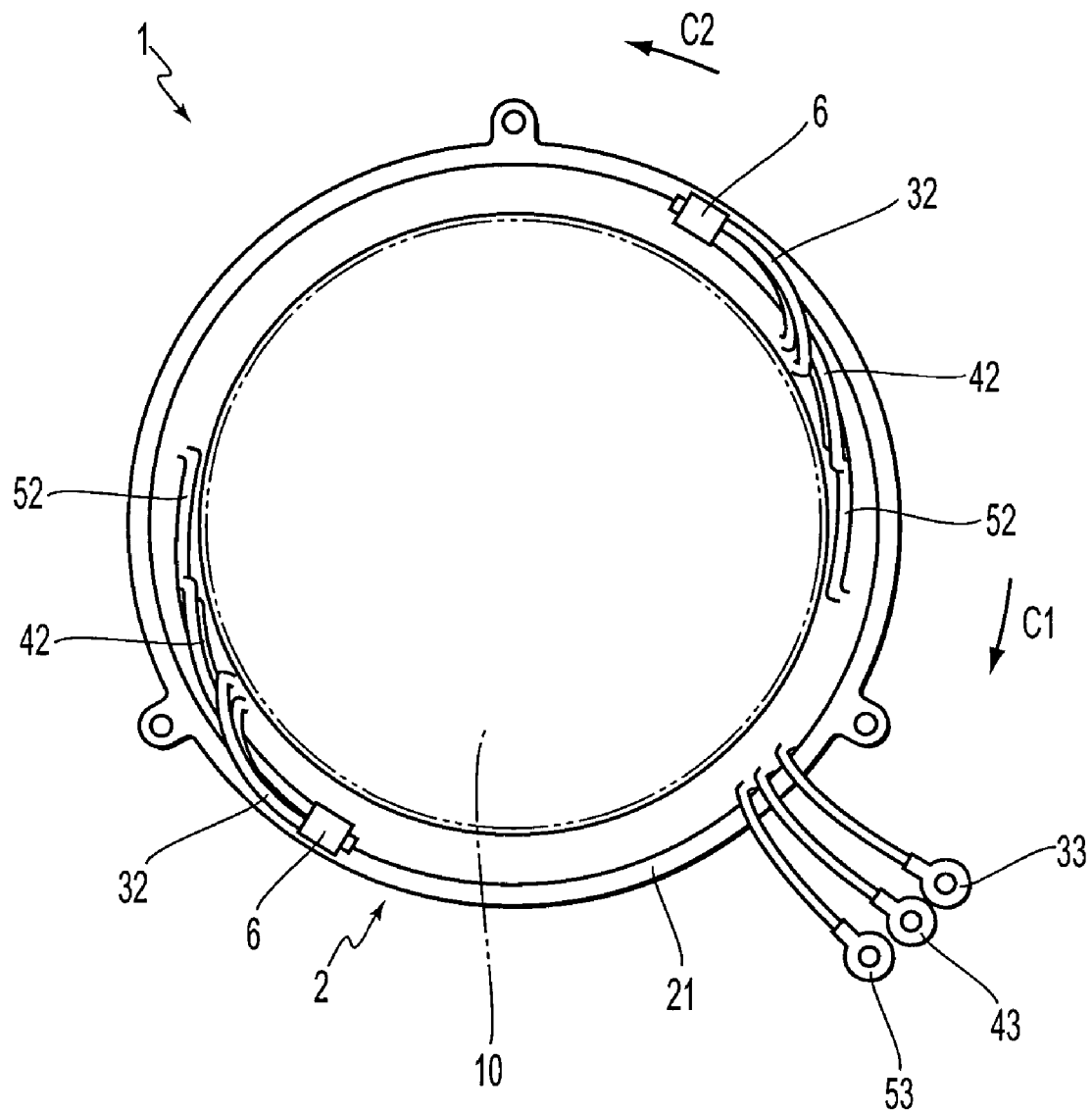
FIG. 1 is an explanatory view showing a state of a stator core in which a neutral point is formed in Example 1, as viewed from an end part in the axial direction.

In this three-phase motor, if the ratio Cv/Cu is less than 0.88, the average length Cv of the electric wires forming the coil end parts of the winding coil of V-phase is shorter than the average length Cu of the electric wires forming the coil end parts of the winding coil of U-phase, and the dimension of protrusion of the coil end parts of the winding coil of U-phase becomes larger than the dimension of protrusion of the coil end parts of the winding coil of V-phase. Therefore, the dimensions of protrusion of the coil end parts of the winding coils of the three phases cannot be substantially equalized.

On the other hand, if the ratio Cv/Cu is more than 0.98, the average length Cv of the electric wires forming the coil end parts of the winding coil of V-phase is close to the average length Cu of the electric wires forming the coil end parts of the winding coil of U-phase. As the coil end parts of the winding coil of U-phase are optimally deformed and shifted, the dimension of protrusion of the coil end parts of the winding coil of U-phase becomes smaller than the dimension of protrusion of the coil end parts of the winding coil of V-phase. Therefore, the dimensions of protrusion of the coil end parts of the winding coils of the three phases cannot be equalized as much as possible.

If the ratio Cw/Cv is less than 0.88, the average length Cw of the electric wires forming the coil end parts of the winding coil of W-phase is shorter than the average length Cv of the electric wires forming the coil end parts of the winding coil of V-phase. Even when the coil end parts of the winding coil of V-phase are optimally deformed and shifted, the dimension of protrusion of the coil end parts of the winding coil of V-phase becomes larger than the dimension of protrusion of the coil end parts of the winding coil of W-phase. Therefore, the dimensions of protrusion of the coil end parts of the winding coils of the three phases cannot be substantially equalized.

On the other hand, if the ratio Cw/Cv is more than 0.98, the average length Cw of the electric wires forming the coil end parts of the winding coil of W-phase is close to the average length Cv of the electric wires forming the coil end parts of the winding coil of V-phase. As the coil end parts of the winding coil of V-phase are optimally deformed and shifted, the dimension of protrusion of the coil end parts of the winding coil of V-phase becomes smaller than the dimension of protrusion of the coil end parts of the winding coil of W-phase. Therefore, the dimensions of protrusion of the coil end parts of the winding coils of the three phases cannot be equalized as much as possible.

It is more preferred that the above-described ratios Cv/Cu and Cw/Cv are Cv/Cu=0.90 to 0.95 and Cw/Cv=0.90 to 0.95. In this case, the ratios Cv/Cu and Cw/Cv are more optimized and the dimensions of protrusion of the coil end parts of the winding coils of the three phases can be equalized more easily. The overall dimension of protrusion of the coil end parts of the winding coils of the three phases can be reduced to a more optimal dimension.

It is preferred that the pair of insertion parts of the winding coil of U-phase is inserted in the slots and that the pair of coil end parts of the winding coil of U-phase protrudes from the end parts in the axial direction of the stator core. It is preferred that the pair of insertion parts of the winding coil of V-phase is offset from the winding coil of U-phase by a predetermined number of slots in one circumferential direction of the stator core as they are inserted in the slots, and that the pair of coil end parts of the winding coil of V-phase is partly superposed on the inner circumferential side of the pair of coil end parts of the winding coil of U-phase. It is preferred that the pair of insertion parts of the winding coil of W-phase is offset from the winding coil of V-phase by a predetermined number of slots in one circumferential direction of the stator core as they are inserted in the slots, and that the pair of coil end parts of the winding coil of W-phase is partly superposed on the inner circumferential side of the pair of coil end parts of the winding coil of V-phase.

In this case, the individual pairs of insertion parts of the winding coils of U-phase, V-phase and W-phase can be offset by a predetermined number of slots each as they are inserted into the slots. The overall dimension of protrusion of the coil end parts of the winding coils of the three phases can be reduced to an optimal dimension more easily.

It is also preferred that the ratio Cv/Cu and the ratio Cw/Cv are substantially equal. In this case, the relationship of Cv/Cu and Cw/Cv is optimized and the dimensions of protrusion of the coil end parts of the winding coils of the three phases can be equalized more easily. The overall dimension of the protrusion of the coil end parts of the winding coils of the three phases can be reduced to a more optimal dimension.

Figure 7:
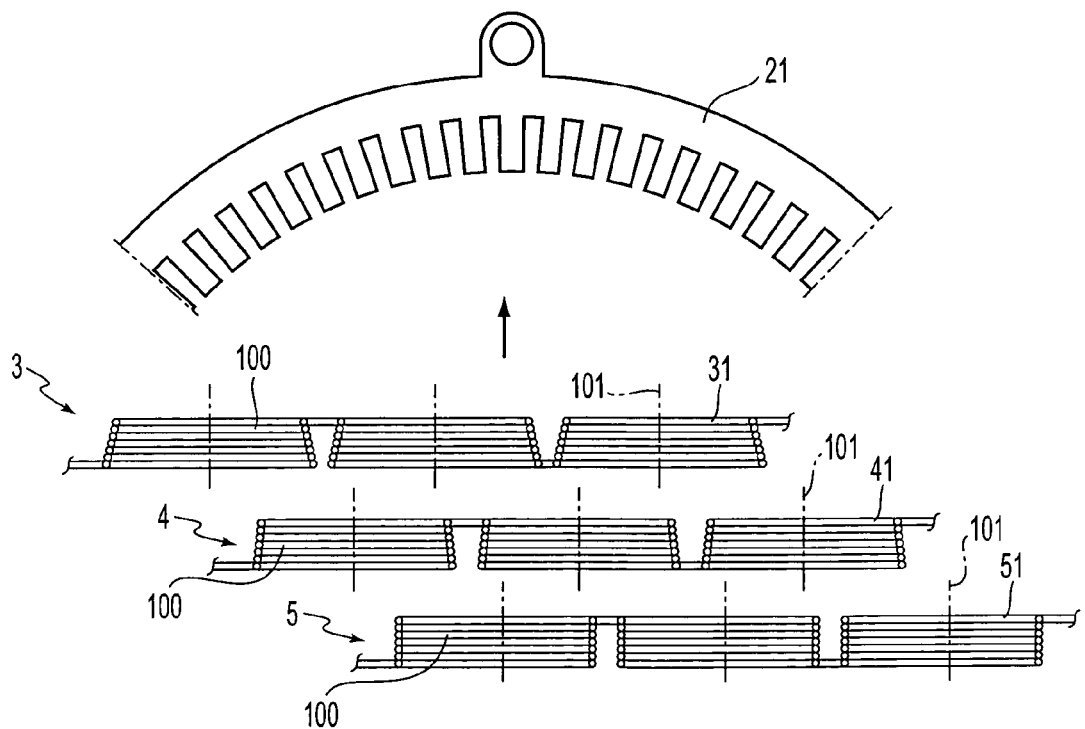
FIG. 7 is an explanatory view showing a state at the time of inserting the winding coils of U-phase, V-phase and W-phase into the stator core in Example 1, as viewed from the end part in the axial direction of the stator core.

It is also preferred that the circumferential length of the electric wires forming the unipolar coils of at least one of the winding coils of the three phases becomes shorter toward the outer circumferential side of the stator core (FIG. 7).

In this case, in at least one of the winding coils of the three phases inserted in the stator core, the side where the electric wires of the unipolar coils have a shorter circumferential length faces the slots of the stator core and is inserted therein. Therefore, in the coil end parts of each of the unipolar coils, the electric wire part situated on the side opposite to the side facing the slots can be deformed and shifted more toward the outer circumferential side of the stator core. Accordingly, the coil end parts can be deformed and shifted more easily and the dimension of protrusion of the coil end parts of the winding coils of the three phases from the end parts in the axial direction of the stator core can be equalized more easily.

The unipolar coils in which the circumferential length of the electric wires forming the unipolar coils becomes shorter toward the outer circumferential side of the stator core can be used only for the winding coils of U-phase and V-phase. As the unipolar coils in the winding coil of W-phase, unipolar coils in which the circumferential length of electric wires hardly changes can be used.

It is also preferred that, with respect to the rate of change of the circumferential length of the electric wires, the rate of change in the winding coil of U-phase is higher than the rate of change in the winding coil of V-phase, and that the rate of change in the winding coil of V-phase is higher than the rate of change in the winding coil of W-phase.

In this case, the rates of change of the circumferential length of the electric wires of the coil end parts of the winding coil of each phase is set, considering that the coil end parts of the winding coil of U-phase are deformed and shifted more than the coil end parts of the winding coil of V-phase and that the coil end parts of the winding coil of V-phase are deformed and shifted more than the coil end parts of the winding coil of W-phase.

That is, as the rate of change of the circumferential length of the electric wires is made higher to allow the coil end parts of the winding coil to be deformed and shifted more largely, the overall dimension of protrusion of the electric wires forming the coil end parts of the winding coils of the three phases can be equalized as much as possible after the coil end parts are deformed and shifted.

As the unipolar coils in the winding coil of W-phase, unipolar coils in which the circumferential length of electric wires hardly changes can be used. The rate of change in the winding coil of W-phase can be substantially zero.

In this invention, it is preferred that the average circumferential length Lv of the unipolar coils in the winding coil of V-phase and the average circumferential length Lw of the unipolar coils in the winding coil of W-phase satisfy the following relational equations:

$$Lv=(S*Lu*n*m-2*\pi*R*Sv)/(S*n*m) \text{ and}$$

$$Lw=(S*Lu*n*m-2*\pi*R*Sw)/(S*n*m)$$

where Lu represents the average circumferential length of the unipolar coils in the winding coil of U-phase, n represents the number of turns of each unipolar coil in the winding coil of each phase, m represents the number of poles of the unipolar coils in the winding coil of each phase, π (pi) represents the ratio of the circumference of a circle to its diameter, R represents the radius from the center of the stator core to the center in the radial direction of the slot (hereinafter referred to as average radius of the stator core), S represents the total number of slots in the stator core, Sv represents the number of slots by which the winding coil of V-phase is offset from the winding coil of U-phase in the first direction of the stator core, and Sw represents the number of slots by which the winding coil of W-phase is offset from the winding coil of U-phase in the first direction of the stator core.

In this case, the average circumferential length of the unipolar coils in the winding coils of the three phases are varied by the amount of difference in the length of neutral point side lead part between the winding coils of the three phases. As the total lengths of the electric wires forming the winding coils of the three phases are made substantially equal, the conductor resistance in the winding coils of the three phase can be made substantially equal.

The values calculated from the relational equations Lv and Lw are theoretically acquired values. In the case of actually producing the winding coils of the three phases, neutral point and the like, some errors may occur. The relational equations Lv and Lw are modifications of relational equations $2*\pi*R*Sv/S=(Lu-Lv)*n*m$ and $2*\pi*R*Sw/S=(Lu-Lw)*n*m$.

That is, in the relational equation of Lv, the amount by which the length of the neutral point side lead part of the winding coil of V-phase is longer than the length of the neutral point side lead part of the winding coil of U-phase is $2*\pi*R*Sv/S$. In the relational equation of Lv, the amount by which the average circumferential length of the unipolar coils in the winding coil of U-phase is longer than the average circumferential length of the unipolar coils in the winding coil of V-phase is Lu–Lv. The relational equation of Lv is derived in consideration of the number of turns n of each unipolar coil in the winding coil of each phase and the number of poles m of the unipolar coils in the winding coil of each phase.

In the relational equation of Lw, the amount by which the length of the neutral point side lead part of the winding coil of W-phase is longer than the length of the neutral point side lead part of the winding coil of U-phase is $2*\pi*R*Sw/S$. In the relational equation of Lw, the amount by which the average circumferential length of the unipolar coils in the winding coil of U-phase is longer than the average circumferential length of the unipolar coils in the winding coil of W-phase is Lu–Lw. Also the relational equation of Lw is derived in consideration of the number of turns n of each unipolar coil in the winding coil of each phase and the number of poles m of the unipolar coils in the winding coil of each phase.

It is also preferred that the circumferential length of the electric wires forming the unipolar coils in the winding coils of U-phase and V-phase becomes shorter toward the outer circumferential side of the stator core.

In this case, in the winding coils of U-phase and V-phase inserted in the stator core, the side where the electric wire of each unipolar coil has a shorter circumferential length faces the slots of the stator core and is inserted therein. Therefore, in the coil end parts of each unipolar coil, the electric wire part situated on the side opposite to the side facing the slots can be deformed and shifted more largely toward the outer circumferential side of the stator core. Accordingly, the coil end parts can be deformed and shifted more easily and the overall dimension of the coil end parts of the winding coils of the three phases can be reduced further.

It is also preferred that, with respect to the rates of change of the circumferential length of the electric wires, the rate of change in the winding coil of U-phase is higher than the rate of change in the winding coil of V-phase.

In this case, the pair of coil end parts of each unipolar coil in the winding coil of U-phase can be deformed and shifted more easily than the pair of coil end parts of each unipolar coil in the winding coil of V-phase. Therefore, the overall dimension of the coil end parts of the winding coils of the three phases can be reduced further.

EXAMPLES

Examples of the three-phase motor of the invention will now be described with reference to the drawings.

Example 1

Figure 3:
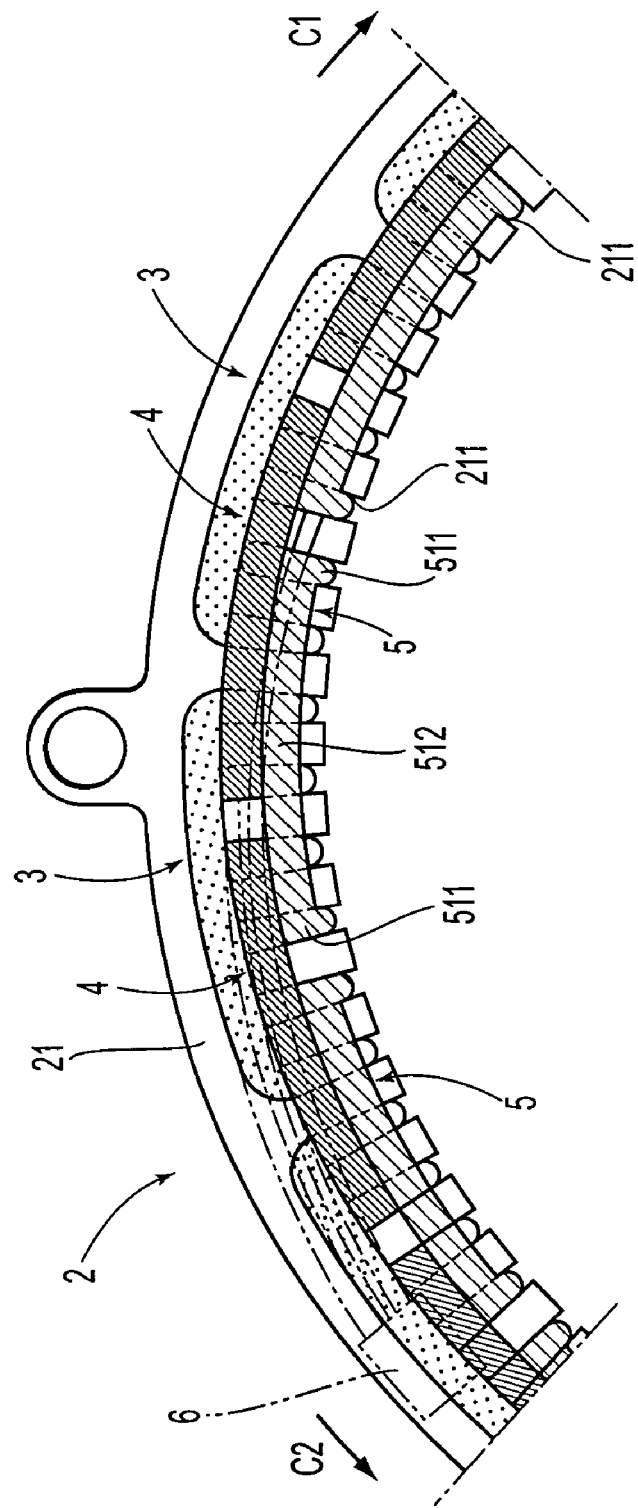
FIG. 3 is an explanatory view showing a state in which the winding coils of U-phase, V-phase and W-phase are inserted into the stator core in Example 1, as viewed from the end part in the axial direction of the stator core.

As shown in FIGS. 1 and 3, a three-phase motor 1 of this example is a three-phase AC motor and has a distributed winding type stator 2 in which winding coils 3, 4, 5 of three phases of U-phase, V-phase and W-phase are sequentially inserted in a distributed manner into many slots 211 provided on the inner circumferential side of a ring-shaped stator core 21.

Figure 2:
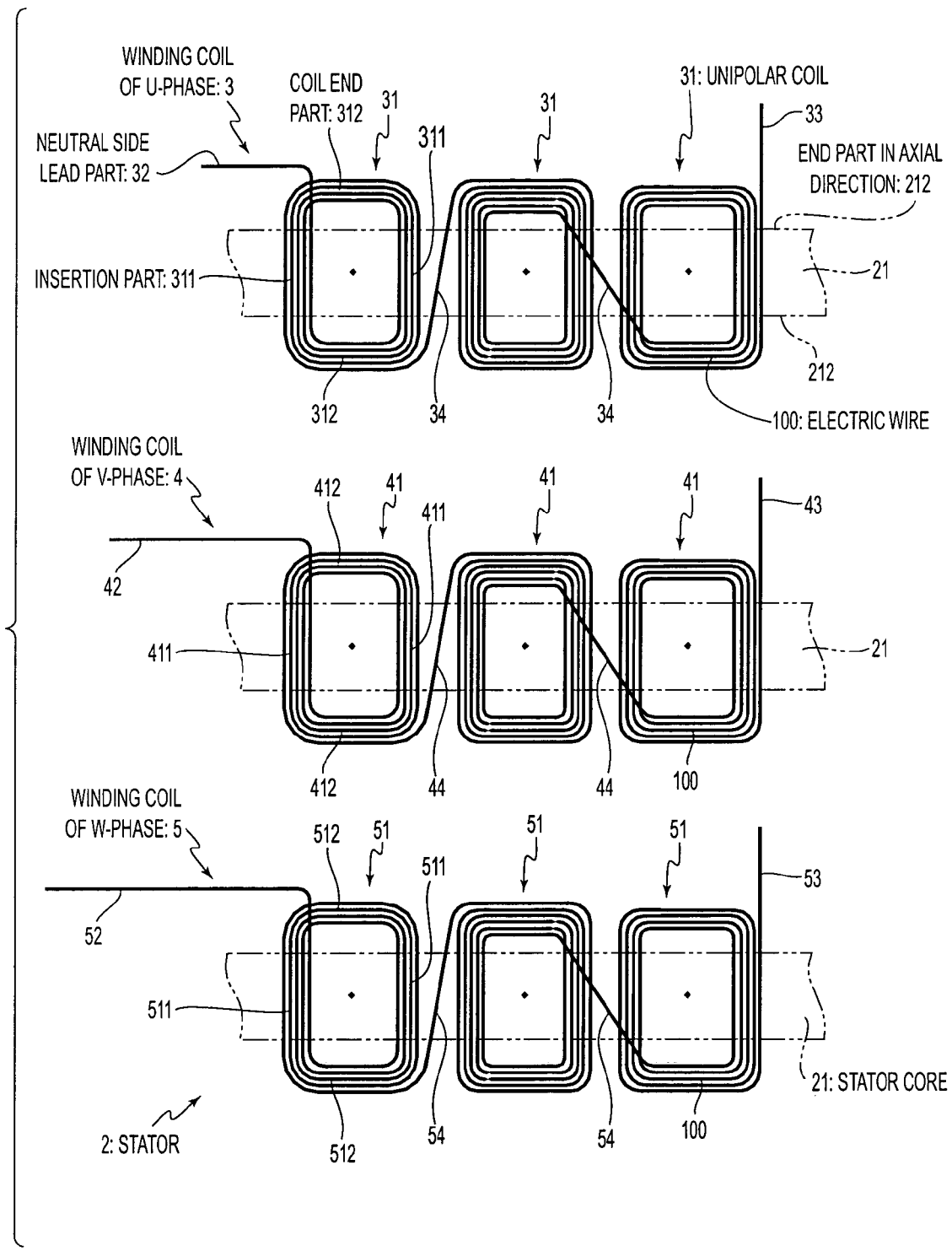
FIG. 2 is an explanatory view schematically showing the difference in average circumferential length of unipolar coils between winding coils of U-phase, V-phase and W-phase, and the difference in length of a neutral point side lead part between the winding coils of U-phase, V-phase and W-phase, in Example 1.

As shown in FIG. 2, each of the winding coils 3, 4, 5 of the three phases has plural unipolar coils 31, 41 or 51 formed by winding electric wires 100 a plurality of times, connecting wires 34, 44 or 54 for connecting the unipolar coils 31, 41 or 51, and a pair of lead parts 32, 33, 42, 43, or 52, 53 formed by leading out the electric wires 100 from the unipolar coils 31, 41 or 51, arranged at both ends of the plural unipolar coils 31, 41 or 51.

As shown in FIG. 2, each of the unipolar coils 31, 41, 51 includes a pair of insertion parts 311, 411 or 511 to be inserted into the slots 211, and a pair of coil end parts 312, 412 or 512 for connecting the pair of insertion parts 311, 411 or 511.

With respect to the average circumferential lengths (average length of a coil if straightened) of the unipolar coils 31, 41, 51 in the winding coils 3, 4, 5 of the three phases, the average circumferential length in the winding coil of V-phase is shorter than the average circumferential length in the winding coil of U-phase, and the average circumferential length in the winding coil of W-phase is shorter than the average circumferential length in the winding coil of V-phase.

Figure 4:
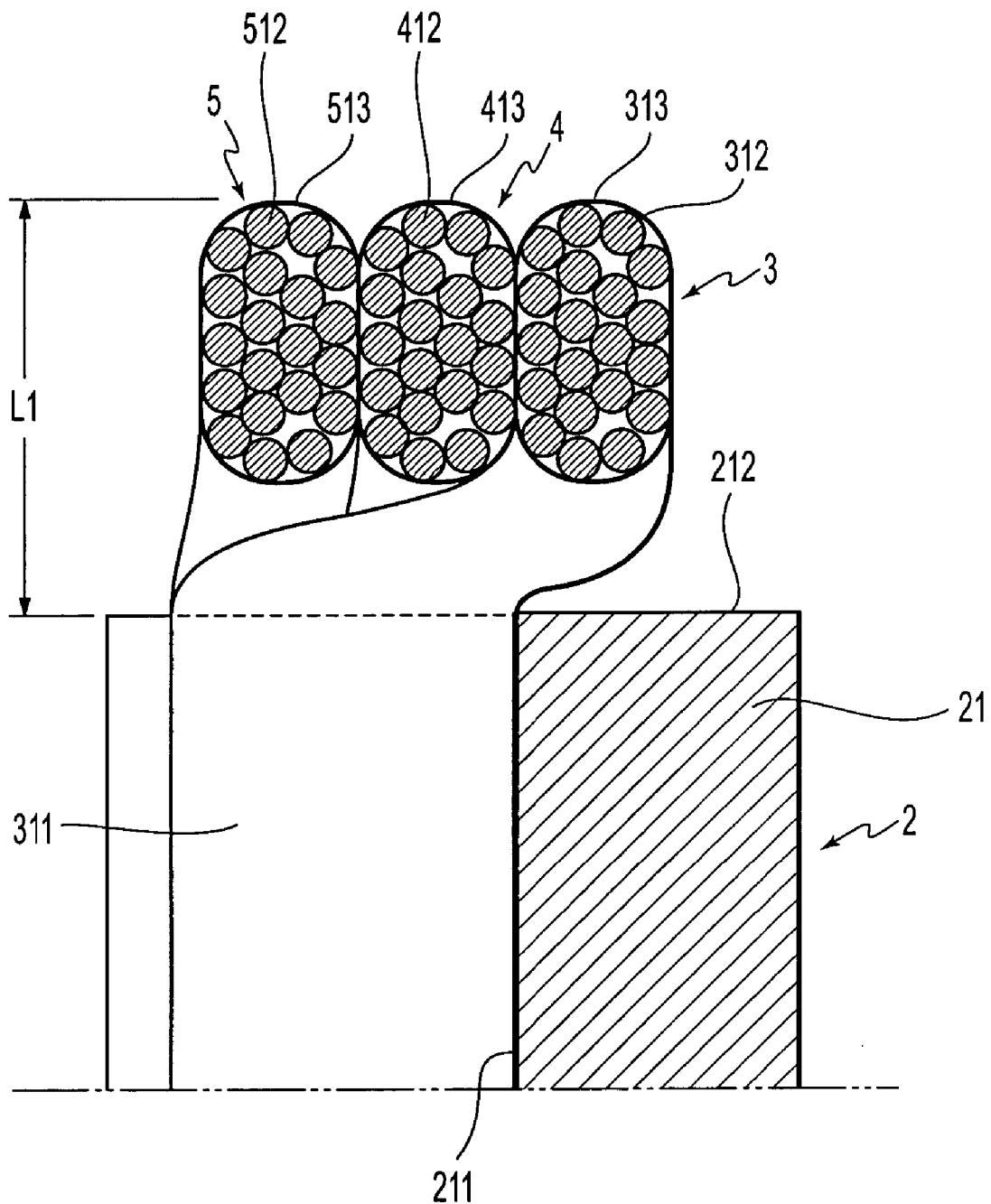
FIG. 4 is an explanatory view showing a state in which coil end parts of the winding coils of U-phase, V-phase and W-phase protrude from the end part in the axial direction of the stator core.
Figure 5:
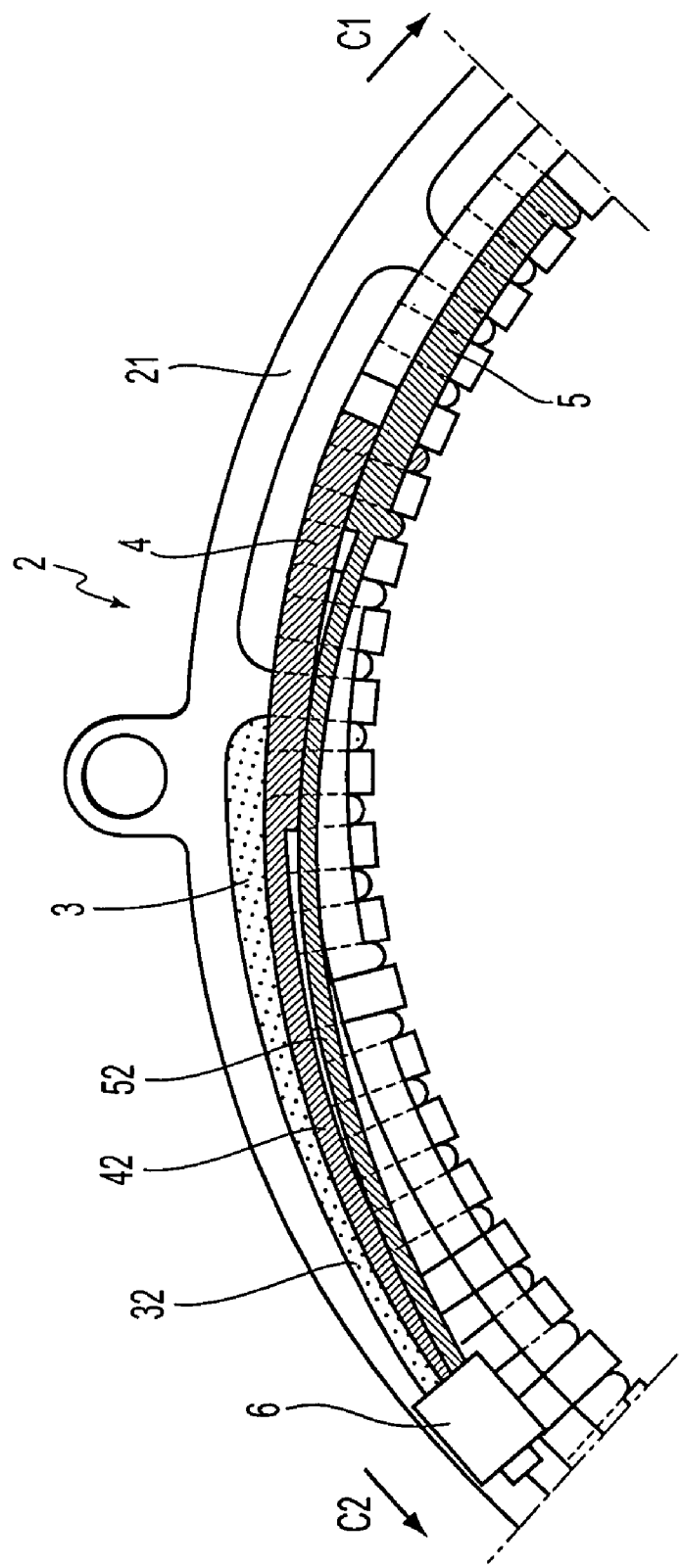
FIG. 5 is an explanatory view showing a state in which the neutral point lead parts of the winding coils of U-phase, V-phase and W-phase are bundled to form a neutral point in Example 1, as viewed from the end part in the axial direction of the stator core.

As shown in FIGS. 3 to 5, the pair of insertion parts 311 of the winding coil 3 of U-phase is inserted in the slots 211, and the pair of coil end parts 312 of the winding coil 3 of U-phase protrudes from end parts 212 in the axial direction of the stator core 21.

The pair of insertion parts 411 of the winding coil 4 of V-phase is offset from the winding coil 3 of U-phase by a predetermined number of slots in a first direction C1, which is one circumferential direction of the stator core 21, as they are inserted in the slots 211. The pair of coil end parts 412 of the winding coil 4 of V-phase is partly superposed on the inner circumferential side of the pair of coil end parts 312 of the winding coil 3 of U-phase.

The pair of insertion parts 511 of the winding coil 5 of W-phase is offset from the winding coil 4 of V-phase by a predetermined number of slots in the first direction C1 of the stator core 21 as they are inserted in the slots 211. The pair of coil end parts 512 of the winding coil 5 of W-phase is partly superposed on the inner circumferential side of the pair of coil end parts 412 of the winding coil 4 of V-phase.

Figure 10:
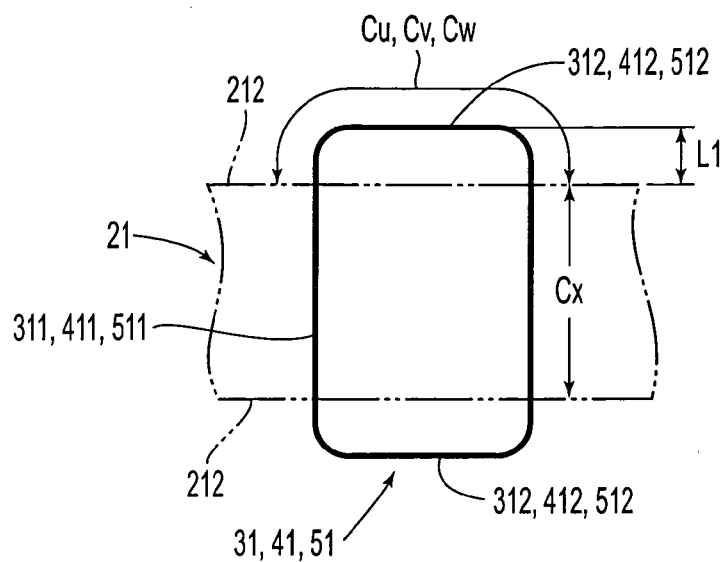
FIG. 10 is an explanatory view schematically showing a state in which the coil end parts of the winding coils of U-phase, V-phase and W-phase protrude from the end parts in the axial direction of the stator core in Example 1.

The winding coils 3, 4, 5 of the three phases have the relationships of Cv/Cu=0.88 to 0.98 and Cw/Cv=0.88 to 0.98, where Cu represents the average length of the electric wires 100 forming the coil end parts 312 of each of the unipolar coils 31 in the winding coil 3 of U-phase, Cv represents the average length of the electric wires 100 forming the coil end parts 412 of each of the unipolar coils 41 in the winding coil 4 of V-phase, and Cw represents the average length of the electric wires 100 forming the coil end parts 512 of each of the unipolar coils 51 in the winding oil 5 of W-phase (see FIG. 10).

As shown in FIGS. 1, 2 and 5, in the stator 2, the lead part situated at an end part in a second direction C2, opposite to the first direction C1, of the stator core 21, of the pair of lead parts 32, 33, 42, 43, or 52, 53 of the winding coil 3, 4 or 5 of each phase, is used as a neutral point side lead part 32, 42 or 52. In the stator 2, the neutral point side lead parts 32, 42, 52 are bundled to form a neutral point 6 at a position where an offset from the winding coil 3 of U-phase is made by a predetermined angle in the second direction C2.

As the neutral point 6 is formed, the neutral point side lead part 42 of the winding coil 4 of V-phase is longer than neutral point side lead part 32 of the winding coil 3 of U-phase. Moreover, the neutral point side lead part 52 of the winding coil 5 of W-phase is longer than the neutral point side lead part 42 of the winding coil 4 of V-phase.

Figure 6:
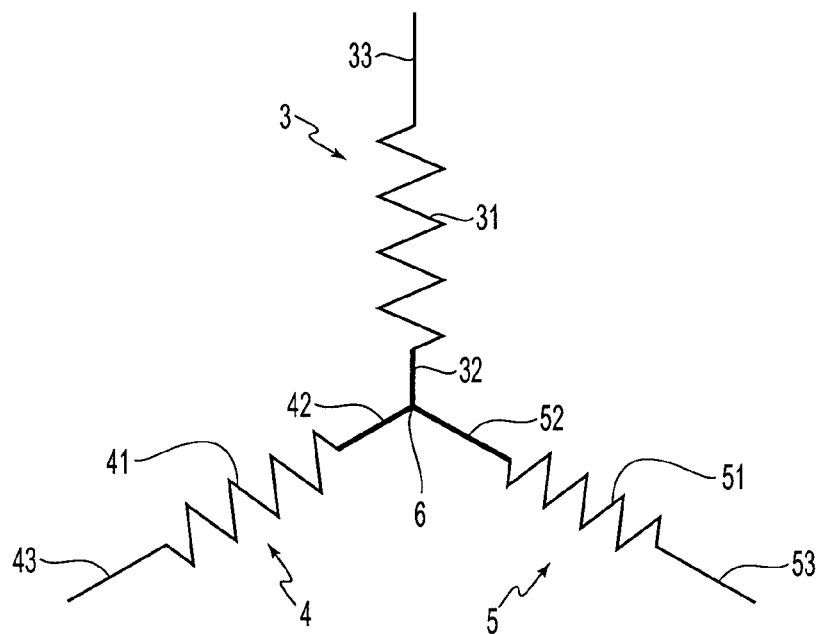
FIG. 6 is an explanatory view schematically showing an electric circuit in which the star connection of the winding coils of U-phase, V-phase and W-phase is made to form a neutral point in Example 1.

The structure will now be described in detail. As shown in FIGS. 2 and 6, in the three-phase motor 1 of this example, the stator 2 is so devised that the ratios of the average lengths Cu, Cv, Cw of the electric wires 100 forming the coil end parts 312, 412, 512 of the unipolar coils 31, 41, 51 in the winding coils 3, 4, 5 of the three phases are set to be optimal between U-phase, V-phase and W-phase.

The electric wire 100 in this example is formed by bundling a plurality of electric wires. In this example, ten wires are bundled to form each electric wire 100.

In the three-phase motor 1 of this example, the average circumferential length of the unipolar coils 31, 41 or 51 in the winding coil 3, 4 or 5 of each phase is varied by phase, thus reducing the overall dimension of protrusion L1 (FIG. 10) of the coil end parts 312, 412, 512 of the winding coils of the three phases (see FIGS. 4 and 10). Moreover, the length of the neutral point side lead part 32, 42 or 52 of the winding coil 3, 4 or 5 of each phase is varied in the reverse manner of the average circumferential length, thus reducing the problem due to the variance of the average circumferential length.

The average length Cu, Cv or Cw is the average of the lengths of the plurality of electric wires forming the coil end parts 312, 412 or 512 of the winding coil 3, 4 or 5 of each phase for each electric wire 100. The average circumferential length is the average of the circumferential lengths of the plurality of electric wires forming the unipolar coils 31, 41 or 51 in the winding coil 3, 4 or 5 of each phase for each electric wire 100.

FIGS. 2 and 6 are explanatory views schematically showing the difference in the average circumferential length between the unipolar coils 31, 41, 51 in the winding coils 3, 4, 5 of the three phases, and the difference in the length between the neutral point side lead parts 32, 42, 52 of the winding coils 3, 4, 5 of the three phases. FIG. 6 is also an explanatory view showing an electric circuit formed by the winding coils 3, 4, 5 of the three phases. In the stator 2 in this example, the star connection of the winding coils 3, 4, 5 of the three phases is made to form the neutral point 6.

As shown in FIG. 2, the winding coils 3, 4, 5 of the three phases in this example are tripolar winding coils, each including three unipolar coils 31, 41 or 51.

FIG. 10 is an explanatory view schematically showing a state in which the coil end parts 312, 412, 512 of the winding coils 3, 4, 5 of the three phases protrude from the end parts 212 in the axial direction of the stator core 21. In FIG. 10, the coil end parts 312, 412, 512 of the three phases protrude in substantially a C-shape from the end parts 212 in the axial direction of the stator core 21. The length Cx of the insertion parts 311, 411, 511 of the three phases is substantially equal to the length, or thickness, in the axial direction of the stator core 21. The dimension of protrusion L1, which is the length of protrusion of the coil end parts 312, 412, 512 of the three phases from the end parts 212 in the axial direction of the stator core 21, is from the end part 212 in the axial direction of the stator core 21 to distal end parts 313, 413, 513 (FIG. 4) in the axial direction of the coil end parts 312, 412, 512 of the three phases (see FIG. 4).

As shown in FIG. 1, the three-phase motor 1 has a rotor 10 rotating on the inner circumferential side of the stator 2. As shown in FIGS. 1, 2 and 6, in the stator 2, the lead part situated at an end part in the first direction C1, of the pair of lead parts 32, 33, 42, 43, or 52, 53 of the winding coil 3, 4 or 5 of each phase, is used as a power cable side lead part 33, 43 or 53 connected to a power source for electrifying each winding coil 3, 4 or 5.

As shown in FIG. 3, the unipolar coils 31, 41, 51 in the winding coils 3, 4, 5 of the three phases in this example are inserted at predetermined spacings in the slots 211. Therefore, as shown in FIGS. 2 and 4, the pair of insertion parts 311, 411 or 511 of each of the unipolar coils 31, 41, or 51 in the winding coil 3, 4 or 5 of each phase has substantially the same length, and the difference in the average circumferential lengths between the winding coils 3, 4, 5 of the three phases is actually the difference in the length of the plurality of electric wires of the electric wire 100 forming the pairs of coil end parts 312, 412, 512.

As shown in FIG. 2, the average circumferential length of the unipolar coils 31 in the winding coil 3 of U-phase is made the longest in order to deform and shift the pair of coil end parts 312 of the winding coil 3 of U-phase, which is inserted first into the stator core 21, most largely among the three phases toward the outer circumferential side of the stator core 21. The average circumferential length of the unipolar coils 51 in the winding coil 5 of W-phase is made the shortest because the pair of coil end parts 512 of the winding coil 5 of W-phase, which is inserted last into the stator core 21, need not be deformed and shifted largely. The average circumferential length of the unipolar coils 41 in the winding coil 4 of V-phase is shorter than the average circumferential length in the winding coil 3 of U-phase and longer than the average circumferential length in the winding coil 5 of W-phase.

As shown in FIG. 4, the average lengths Cu, Cv, Cw of the plurality of electric wires of each electric wire 100 forming the coil end parts 312, 412, 512 of the winding coils 3, 4, 5 of the three phases have the relationship of Cu>Cv>Cw. The dimensions of protrusion, that is, the lengths of protrusion of the pair of coil end parts 312, 412 or 512 from the end parts 212 in the axial direction of the stator core 21, are substantially the same. The relationships of Cv/Cu=0.88 to 0.98 and Cw/Cv=0.88 to 0.98 hold for both coil end parts of each pair of coil end parts 312, 412 or 512. The average lengths Cu, Cv, Cw of the coil end parts 312, 412, 512 are average lengths Cu, Cv, Cw of the coil end parts 312, 412, 512 on each side of the pairs of coil end parts 312, 412, 512.

As shown in FIG. 7, the unipolar coils 31, 41 in the winding coils 3, 4 of U-phase and V-phase are tapered unipolar coils 31, 41 in which the circumferential length (winding diameter) of the electric wire 100 becomes longer toward one end in the direction of a coil axis 101, which is the central axis of winding of the electric wire 100. In the winding coils 3, 4 of U-phase and V-phase, the side where the circumferential length of the electric wires 100 forming the unipolar coils 31, 41 is shorter is caused to face each slot 211 of the stator core 21 and thus inserted into the stator core 21.

In each of the unipolar coils 31, 41 in the winding coils 3, 4 of U-phase and V-phase, when the pair of insertion parts 311 or 411 is inserted in the slots 211 of the stator core 21, the part where the circumferential length of the electric wire 100 is longer, of the pair of coil end parts 312 or 412, is deformed and shifted more largely toward the outer circumferential side of the stator core 21.

As shown in FIG. 7, with respect to the winding coils 3, 4 of U-phase and V-phase inserted in the stator core 21, the rate of change of the circumferential length of the electric wire 100 in the winding coil 3 of U-phase is higher than the rate of change in the winding coil 4 of V-phase. Therefore, the pair of coil end parts 312 of each of the unipolar coils 31 in the winding coil 3 of U-phase can be deformed and shifted more largely and easily than the pair of coil end parts 412 of each of the unipolar coils 41 in the winding coil 4 of V-phase. See FIG. 4 for the deformation.

The unipolar coils 51 in the winding coil 5 of W-phase are straight unipolar coils 51 formed by winding the electric wire 100 with a substantially equal circumferential length. Accordingly, the rate of change of the circumferential length of the electric wire 100 in U-phase is higher than the rate of change in the V-phase, and the rate of change in V-phase is higher than the rate of change in the W-phase. However, the unipolar coils 51 in the winding coil 5 of W-phase can be tapered similarly to the unipolar coils 31, 41 of the winding coils 3, 4 of U-phase and V-phase.

A technique for inserting the winding coils 3, 4, 5 of the three phases into the stator core 21 and the effects of the three-phase motor 1 having the above-described stator 2 will now be described.

Figure 8:
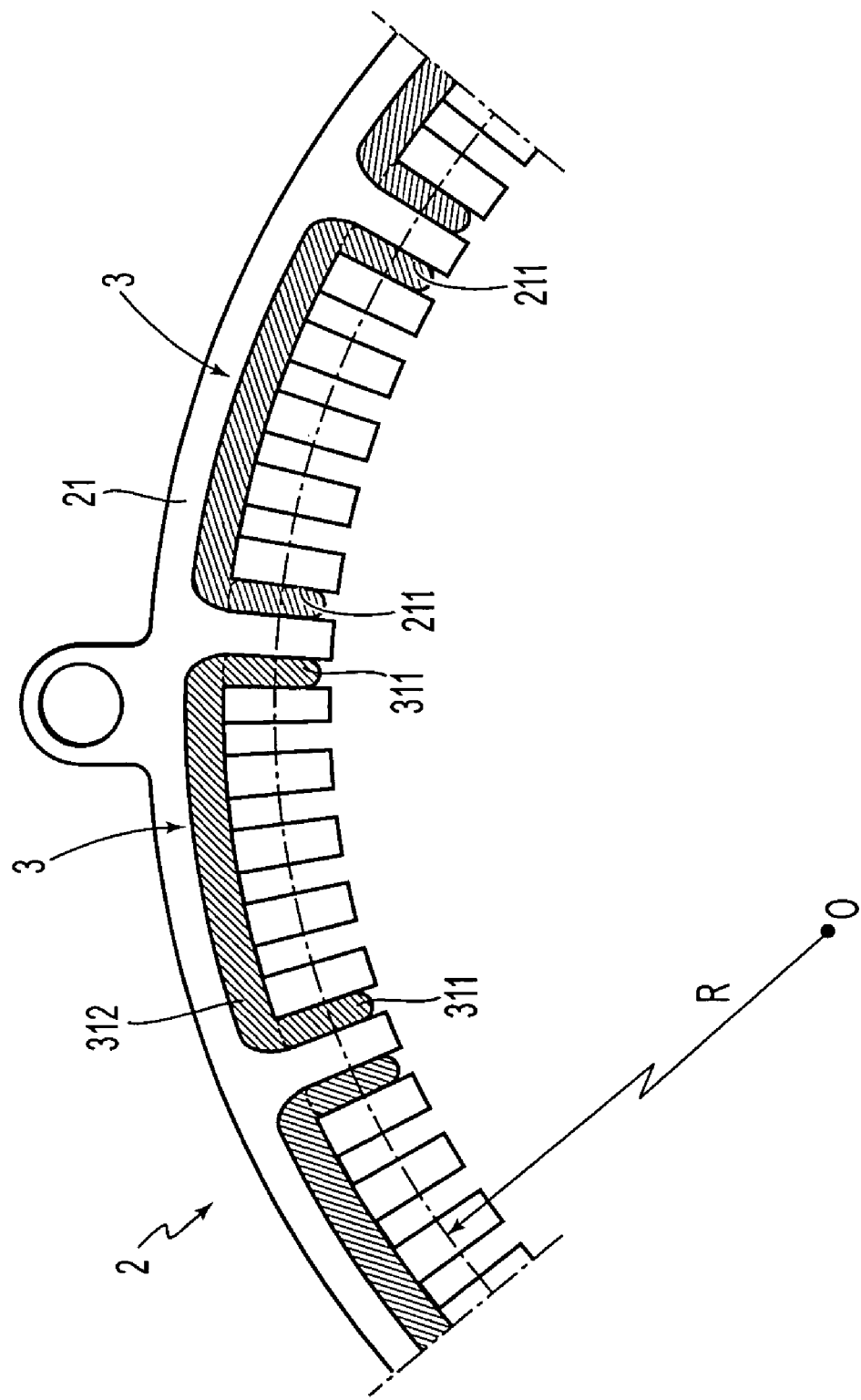
FIG. 8 is an explanatory view showing a state in which the winding coil of U-phase is inserted in the stator core in Example 1, as viewed from the end part in the axial direction of the stator core.
Figure 9:
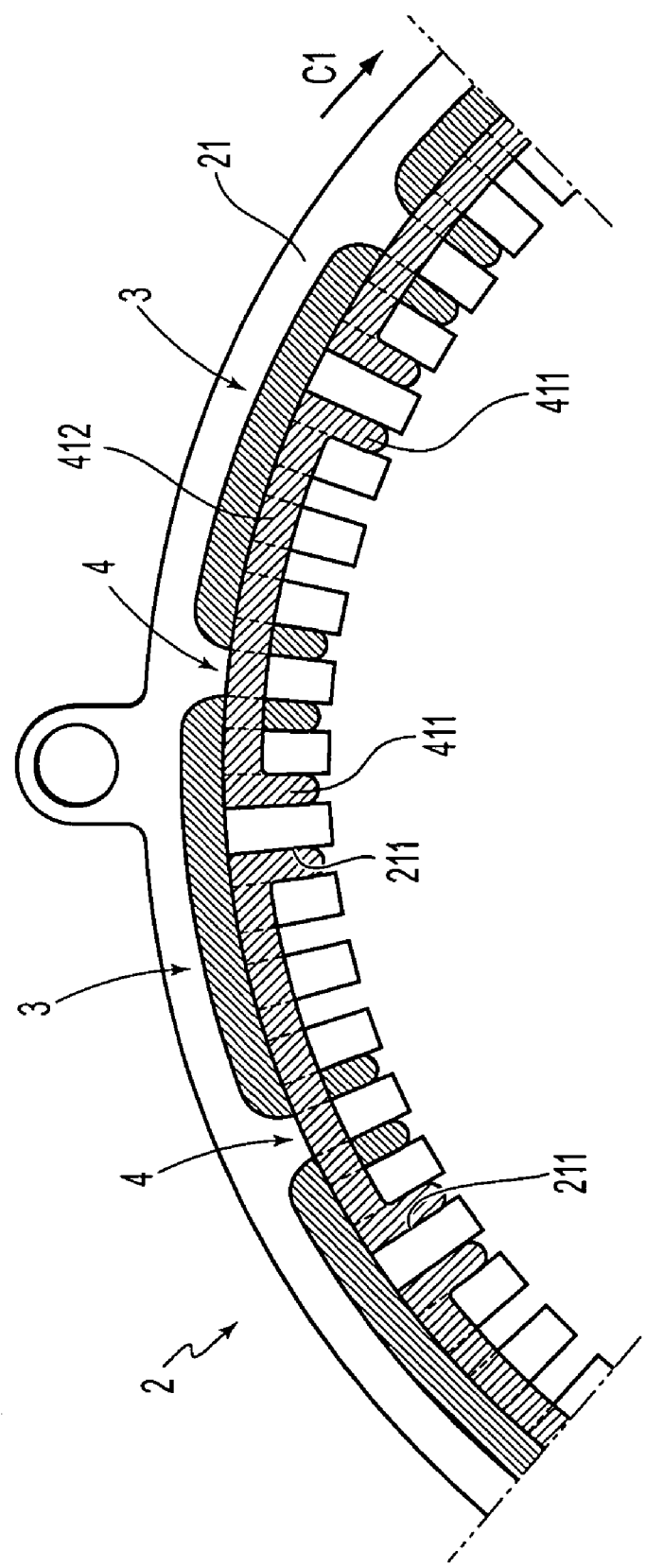
FIG. 9 is an explanatory view showing a state at the time of inserting the winding coil of V-phase into the stator core in Example 1, as viewed from the end part in the axial direction of the stator core.

When inserting the winding coils 3, 4, 5 of the three phases into the stator core 21, the winding coil 3 of U-phase is first inserted into the stator core 21, as shown in FIG. 8, and then the winding coil 4 of V-phase is inserted into the stator core 21, as shown in FIG. 9. After that, the winding coil 5 of W-phase is inserted into the stator core 21, as shown in FIG. 3.

The pair of insertion parts 311, 411 or 511 in the winding coil 3, 4 or 5 of each phase is offset by a predetermined number of slots as they are inserted in the slots 211, as shown in FIG. 3. The pair of coil end parts 312, 412 or 512 in the winding coil 3, 4 or 5 of each phase protrudes from the end parts 212 in the axial direction of the stator core 21, as shown in FIG. 4.

The technique of inserting the winding coils 3, 4, 5 of the three phases will now be described further in detail. First, the pair of insertion parts 311 of each unipolar coil 31 in the winding coil 3 of U-phase is inserted into the slots 211 of the stator core 21, as shown in FIG. 8. After that, the pair of coil end parts 312 in the winding coil 3 of U-phase is deformed and shifted toward the outer circumferential side of the stator core 21 as shown in FIG. 4 in order for the winding coils 4, 5 of V-phase and W-phase to be inserted into the stator core 21.

In this case, the average circumferential length of the unipolar coils 31 in the winding coil 3 of U-phase, that is, the average length Cu of the electric wires 100 forming the coil end parts 312 in the winding coil 3 of U-phase, is the longest in the three phases, as described above. Therefore, the pair of coil end parts 312 in the winding coil 3 of U-phase can be easily deformed and shifted largely toward the outer circumferential side of the stator core 21.

In this case, each unipolar coil 31 in the winding coil 3 of U-phase is wound in a tapered shape, as described above. Therefore, in the pair of coil end parts 312 in the winding coil 3 of U-phase, the part where the circumferential length of the electric wire 100 is longer, situated on the side opposite to the side facing the slots 211 of the stator core 21, can be deformed and shifted more largely toward the outer circumferential side of the stator core 21.

Next, the pair of insertion parts 411 of each unipolar coil 41 in the winding coil 4 of V-phase is inserted into the slots 211 of the stator core 21, as shown in FIG. 9. In this case, the pair of coil end parts 412 in the winding coil 4 of V-phase is partly superposed on the inner circumferential side of the pair of coil end parts 312 in the winding coil 3 of U-phase.

After the winding coil 4 of V-phase is inserted in the stator core 21, the pair of coil end parts 412 in the winding coil 4 of V-phase is deformed and shifted toward the outer circumferential side of the stator core 21, as shown in FIG. 4, in order for the winding coil 5 of W-phase to be inserted into the stator core 21. In this case, the average circumferential length of the unipolar coils 41 in the winding coil 4 of V-phase is longer than the average circumferential length of the unipolar coils 51 in the winding coil 5 of W-phase, as described above. That is, the average length Cv of the electric wires 100 forming the coil end parts 412 in the winding coil 4 of V-phase is longer than the average length Cw of the electric wires 100 forming the coil end parts 512 in the winding coil 5 of W-phase. Therefore, the pair of coil end parts 412 in the winding coil 4 of V-phase can be easily deformed and shifted toward the outer circumferential side of the stator core 21.

Also in this case, each unipolar coil 41 in the winding coil 4 of V-phase is wound in a tapered shape, as described above. Therefore, also in the pair of coil end parts 412 in the winding coil 4 of V-phase, the part where the circumferential length of the electric wire 100 is longer, situated on the side opposite to the side facing the slots 211 of the stator core 21, can be deformed and shifted to a greater extent toward the outer circumferential side of the stator core 21.

Next, the pair of insertion parts 511 of each unipolar coil 51 in the winding coil 5 of W-phase is inserted into the slots 211 of the stator core 21, as shown in FIG. 3. In this case, the pair of coil end parts 512 in the winding coil 5 of W-phase is partly superposed on the inner circumferential side of the pair of coil end parts 412 in the winding coil 4 of V-phase, as shown in FIG. 4. The coil end parts 512 in the winding coil 5 of W-phase are hardly deformed or shifted as they are arranged into the stator core 21.

Next, the neutral point side lead parts 32, 42, 52 situated at the end part in the second direction C2 in the winding coils 3, 4, 5 are bundled to form the neutral point 6, as shown in FIG. 5. In this case, the neutral point side lead parts 32, 42, 52 of the three phases are lead out into the second direction C2 of the stator core 21, and the neutral point 6 is formed at the position where an offset from the winding coil 3 of U-phase is made by a predetermined angle in the second direction C2.

As the neutral point 6 is formed, the neutral point side lead part 42 in the winding coil 4 of V-phase is longer than the neutral point side lead part 32 in the winding coil 3 of U-phase, as shown in FIGS. 1, 2 and 5. The neutral point side lead part 52 in the winding coil 5 of W-phase is longer than the neutral point side lead part 42 in the winding coil 4 of V-phase. In this manner, the winding coils 3, 4, 5 of the three phases can be inserted into the stator core 21 and the neutral point 6 can be formed.

With respect to the average circumferential lengths of the unipolar coils 31, 41, 51 in the winding coils 3, 4, 5 of the three phases, the average circumferential length in V-phase is shorter than the average circumferential length in U-phase, and the average circumferential length in W-phase is shorter than the average circumferential length in V-phase, as described above. With respect to the pair of coil end parts 312, 412 or 512 of each unipolar coil 31, 41 or 51 in the winding coil 3, 4 or 5 of each phase, the coil end parts 312 in U-phase are deformed and shifted to the greatest extent toward the outer circumferential side of the stator core 21, and the coil end parts 412 in V-phase are deformed and shifted to a lesser extent, while the coil end parts 512 in W-phase are hardly deformed or shifted, as described above.

Therefore, the dimensions of protrusion L1, that is, the lengths of protrusion of the coil end parts 312, 412, 512 in the three phases from the end parts 212 in the axial direction of the stator core 21, can be made as short and equal as possible, as shown in FIG. 4. Accordingly, the overall dimension of protrusion of the coil end parts 312, 412, 512 in the winding coils 3, 4, 5 of the three phases can be reduced.

Moreover, in this example, the ratios of the average lengths Cu, Cv, Cw of the electric wires 100 forming the coil end parts 312, 412, 512 in the winding coils 3, 4, 5 of the three phases are set so that the relationships of Cv/Cu=0.88 to 0.98 and Cw/Cv=0.88 to 0.98 hold. Therefore, the coil end parts 312, 412, 512 in the winding coils 3, 4, 5 of the three phases can be deformed and shifted by an optimum amount.

Thus, according to the three-phase motor 1 having the above-described stator 2, the dimensions of the protrusion L1 of the coil end parts 312, 412, 512 in the winding coils 3, 4, 5 of the three phases can be equalized as much as possible, and the overall dimension of protrusion L1 of the coil end parts 312, 412, 512 in the winding coils 3, 4, 5 of the three phases can be reduced to an optimum dimension.

The lengths of the neutral point side lead parts 32, 42, 52 in the winding coils 3, 4, 5 of the three phases are varied in the reverse manner of the average circumferential lengths of the unipolar coils 31, 41, 51 in the winding coils 3, 4, 5 of the three phases, as described above. The length of the neutral point side lead part 42 in V-phase is longer than the length of the neutral point side lead part 32 in U-phase, and the length of the neutral point side lead part 52 in W-phase is longer than the length of the neutral point side lead part 42 in V-phase.

Therefore, the difference in the average circumferential length between the unipolar coils 31, 41, 51 in the winding coils 3, 4, 5 of the three phases can be compensated by the difference in the length between the neutral point side lead parts 32, 42, 52 in the winding coils 3, 4, 5 of the three phases. This can minimize the difference in the total length of the electric wires 100 forming the winding coils 3, 4, 5 of the three phases.

Thus, according to the three-phase motor 1 having the above-described stator 2, the difference in the conductor resistance between winding coils 3, 4, 5 of the three phases is minimized, and the overall dimension of protrusion L1 of the coil end parts 312, 412, 512 in the winding coils 3, 4, 5 of the three phases can be reduced to an optimum dimension.

In summary, the stator is formed by first inserting the winding coil of U-phase into the stator core, then inserting the winding coil of V-phase into the stator core and then inserting the winding coil of W-phase into the stator core. In the stator, the pair of insertion parts of the winding coil of each phase is inserted into the slots and the pair of coil end parts of the winding coil of each phase protrudes from end parts in an axial direction of the stator core.

Meanwhile, after the pair of insertion parts of the winding coil of U-phase is inserted into the slots of the stator core, the pair of coil end parts of the winding coil of U-phase is deformed and shifted toward an outer circumferential side of the stator core in order for the winding coils of V-phase and W-phase to be inserted into the stator core. In this case, the average length Cu of the electric wires forming the coil end parts of the winding coil of U-phase is the longest of all the average lengths of the electric wires of the winding coils of the three phases, as described above. Therefore, the coil end parts of the winding coil of U-phase can be easily and largely deformed and shifted toward the outer circumferential side of the stator core.

When the pair of insertion parts of the winding coil of V-phase is inserted into the slots of the stator core, the pair of coil end parts of the winding coil of V-phase is partly superposed on an inner circumferential side of the pair of coil end parts of the winding coil of U-phase.

After the pair of insertion parts of the winding coil of V-phase is inserted in the slots of the stator core, the pair of coil end parts of the winding coil of V-phase is deformed and shifted toward the outer circumferential side of the stator core in order for the winding coil of W-phase to be inserted into the stator core.

In this case, the average length Cv of the electric wires forming the coil end parts of the winding coil of V-phase is longer than the average length Cw of the electric wires forming the coil end parts of the winding coil of W-phase, as described above. Therefore, the coil end parts of the winding coil of V-phase can be easily deformed and shifted toward the outer circumferential side of the stator core.

When the pair of insertion parts of the winding coil of W-phase is inserted into the slots of the stator core, the pair of coil end parts of the winding coil of W-phase is partly superposed on an inner circumferential side of the pair of coil end parts of the winding coil of V-phase. The pair of coil end parts of the winding coil of W-phase is provided in the stator core without being largely deformed or shifted.

In this manner, the coil end parts of the winding coil of U-phase, which has the electric wires of the longest average length Cu of all the average lengths in the winding coils of the three phases, are deformed and shifted most largely. The coil end parts of the winding coil of V-phase, which has the electric wires of the longer average length Cv than the average length of the electric wires of the winding coil of W-phase, are deformed and shifted. Then, the coil end parts of the winding coil of W-phase, which has the electric wires of the shortest average length Cw of all the average length in the winding coils of the three phases, are not deformed nor greatly shifted. Thus, the dimensions of protrusion, that is, the lengths of protrusion of the coil end parts in the winding coils of the three phases from the end part in the axial direction of the stator core, can be made as short and equal as possible.

Moreover, in this invention, the ratios of the average lengths of the electric wires forming the coil end parts of the winding coils of the three phases are set to have relationships of Cv/Cu=0.88 to 0.98 and Cw/Cv=0.88 to 0.98. Therefore, the coil end parts of the winding coil of each phase can be deformed and shifted by an optimum quantity.

Therefore, in the three-phase motor having the above-described stator, the dimensions of the protrusion of the coil end parts of the winding coils of the three phases can be made as equal as possible and the overall dimension of the protrusion of the coil end parts of the winding coils of the three phases can be reduced to an optimum dimension.

The pair of coil end parts of the winding coil of U-phase may be deformed and shifted while inserting the winding coil of V-phase into the stator core. If possible, the pair of coil end parts of the winding coil of U-phase may be deformed and shifted before inserting the winding coil of U-phase into the stator core. The coil end parts of the winding coils of V-phase and W-phase can be deformed and shifted in a similar manner.

The average lengths Cu, Cv, Cw of the coil end parts is the average length Cu, Cv, Cw of the coil end parts on one side of each pair of coil end parts. The electric wires forming the coil end parts on one side of each pair of coil end parts, or the individual electric wires forming the pair of coil end parts may have the above-described relationships of Cv/Cu=0.88 to 0.98 and Cw/Cv=0.88 to 0.98.

Example 2

In this example, the three-phase motor 1 is described in which the ratios of the average lengths Cu, Cv, Cw of the electric wires 100 forming the coil end parts 312, 412, 512 in the winding coils 3, 4, 5 of the three phases are set to have the relationships of Cv/Cu=0.88 to 0.98 and Cw/Cv=0.88 to 0.98. Table 1 shows the dimensional relationships of the unipolar coils 31, 41, 51 of the winding coils 3, 4, 5 of the three phases in the three-phase motor 1 (invented product) of this example 2.

Table 1—Example 2

Each of the unipolar coils 31, 41, 51 of the winding coils 3, 4, 5 of the three phases in the three-phase motor 1 of this example is formed by winding the electric wire 100 six times (six turns). The first turn of each of the unipolar coils 31, 41, 51 is arranged on the deepest side in the slot 211 of the stator core 21 when arranging each of the winding coils 3, 4, 5. The sixth turn of each of the unipolar coils 31, 41, 51 is arranged at the inner radial end of the slot 211 of the stator core 21.

Each of the unipolar coils 31, 41 in the winding coils 3, 4 of U-phase and V-phase is a tapered unipolar coil 31 or 41 in which the circumferential length of the electric wire 100 forming the coil is shorter at the outer circumferential side of the stator core 21 because it is wound tighter and the radially inward (inner circumferential side of the stator core 21) winding is longer as it is wound more loosely to allow for the deformation and shifting. Each of the unipolar coils 51 in the winding coil 5 of W-phase is a substantially uniform unipolar coil 51 in which the circumferential length of the electric wire 100 forming the coil is substantially the same but may be slightly longer toward the outer circumferential side of the stator core 21.

Figure 12:
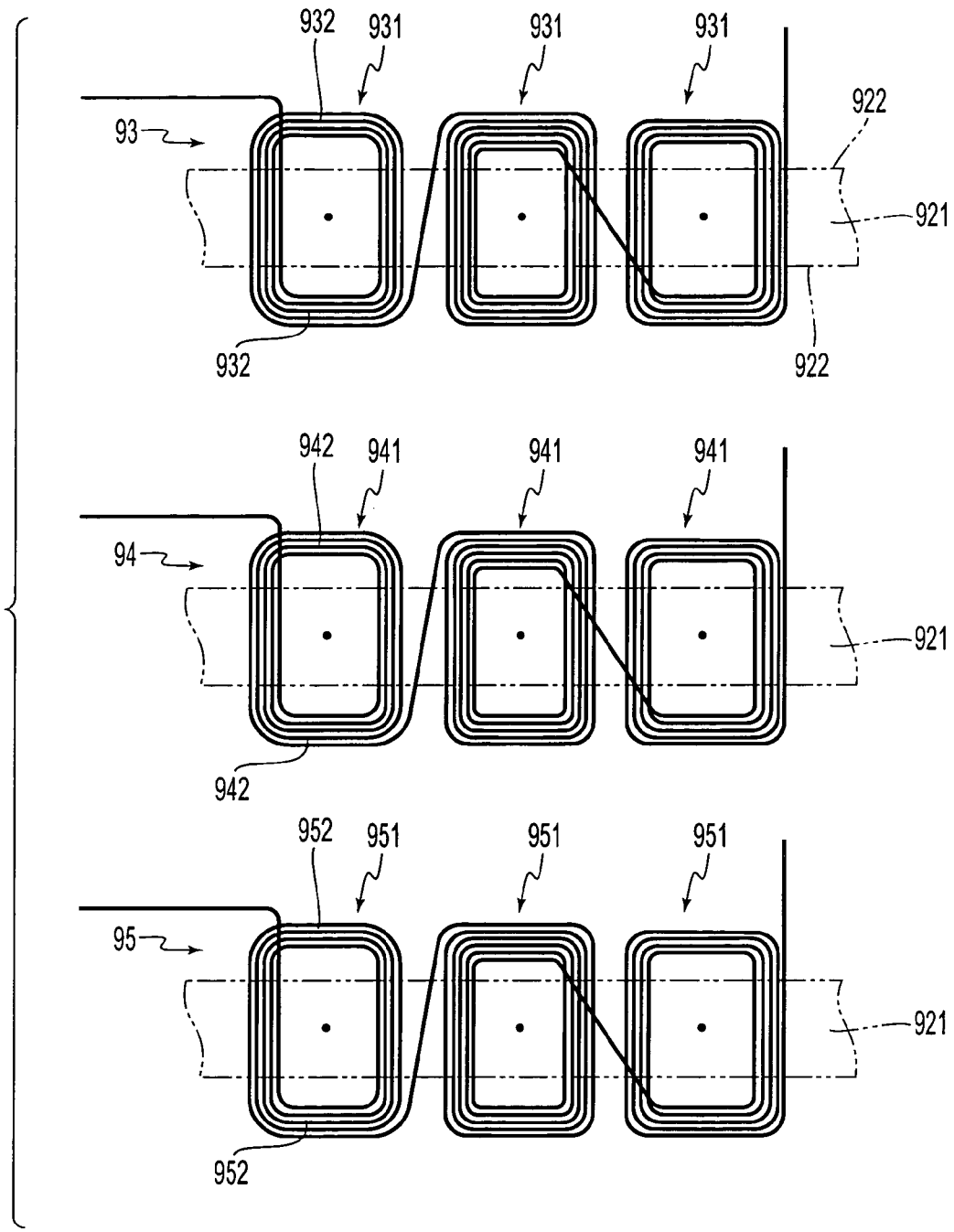
FIG. 12 is an explanatory view schematically showing average circumferential lengths of unipolar coils in winding coils of U-phase, V-phase and W-phase in a conventional example.

Meanwhile, Table 2 shows the dimensional relations of the unipolar coils 931, 941, 951 of the winding coils 93, 94, 95 of the three phases in the conventional three-phase motor 1 (comparative product; see FIG. 12), in which the average lengths Cu, Cv, Cw of the electric wires forming the coil end parts 932, 942, 952 in the winding coils 93, 94, 95 of the three phases are substantially equal.

Table 2—Comparative Example

TABLE 1

Example 2

| Unipolar coil | U-phase | | V-phase | | W-phase | |
|---|---|---|---|---|---|---|
| | Circumferential length of each turn | Length of coil end part of each turn | Circumferential length of each turn | Length of coil end part of each turn | Circumferential length of each turn | Length of coil end part of each turn |
| First turn | 433 | 104.5 | 428 | 102 | 427 | 102 |
| Second turn | 439 | 107.5 | 431 | 104 | 426 | 101 |
| Third turn | 445 | 110.5 | 434 | 105 | 425 | 101 |
| Fourth turn | 451 | 113.5 | 437 | 107 | 424 | 100 |
| Fifth turn | 457 | 116.5 | 440 | 108 | 423 | 100 |
| Sixth turn | 463 | 119.5 | 443 | 110 | 422 | 99 |
| | Average circumferential length | Average length Cu | Average circumferential length | Average length Cv | Average circumferential length | Average length Cw |
| | 448 | 112 | 435.5 | 106 | 424.5 | 100.5 |

TABLE 2

Comparative Example

| Unipolar coil | U-phase | | V-phase | | W-phase | |
|---|---|---|---|---|---|---|
| | Circumferential length of each turn | Length of coil end part of each turn | Circumferential length of each turn | Length of coil end part of each turn | Circumferential length of each turn | Length of coil end part of each turn |
| First turn | 433 | 104.5 | 433 | 104.5 | 433 | 104.5 |
| Second turn | 439 | 107.5 | 439 | 107.5 | 439 | 107.5 |
| Third turn | 445 | 110.5 | 445 | 110.5 | 445 | 110.5 |
| Fourth turn | 451 | 113.5 | 451 | 113.5 | 451 | 113.5 |
| Fifth turn | 457 | 116.5 | 457 | 116.5 | 457 | 116.5 |
| Sixth turn | 463 | 119.5 | 463 | 119.5 | 463 | 119.5 |
| | Average circumferential length | Average length Cu | Average circumferential length | Average length Cv | Average circumferential length | Average length Cw |
| | 448 | 112 | 448 | 112 | 448 | 112 |

In example 2, the ratios of the average lengths Cu, Cv, Cw of the electric wires 100 forming the coil end parts 312, 412, 512 of the unipolar coils 31, 41, 51 in the winding coils 3, 4, 5 of the three phases were set at Cv/Cu=106/112=approximately 0.95 and Cw/Cv=100.5/106=approximately 0.95. Thus, Cv/Cu and Cw/Cv were made substantially the same. In both example 2 and the comparative example, the lengths of the stator cores 21, 921 in the axial direction were 100 mm and the minimum inner diameters of the stator cores 21, 921 were 100 mm.

Figure 13:
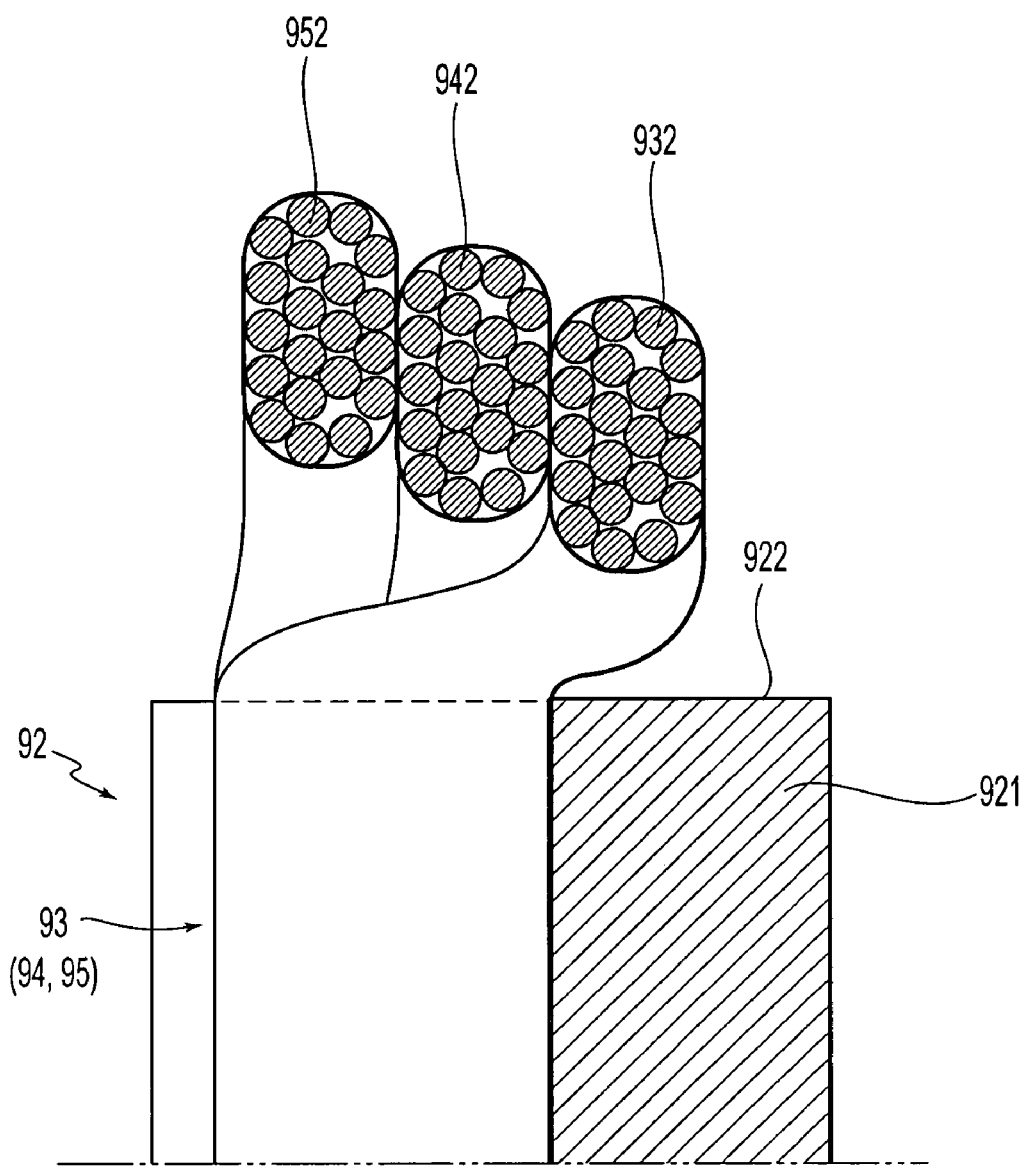
FIG. 13 is an explanatory view showing a state where coil end parts of the winding coils of U-phase, V-phase and W-phase protrude from an end part in the axial direction of a stator core in the conventional example.

As the winding coils 3, 4, 5 of the three phases of example 2 were arranged in the stator core 21, the dimensions of protrusion L1 of the coil end parts 312, 412, 512 in the winding coils 3, 4, 5 of the three phases could be substantially equalized, and the overall dimension of protrusion L1 of the coil end parts 312, 412, 512 in the winding coils 3, 4, 5 of the three phases was approximately 33 mm. On the other hand, as the winding coils 93, 94, 95 of the three phases of the comparative example were arranged in the stator core 921, the dimensions of protrusion L1 of the coil end parts 932, 942, 952 in the winding coils 93, 94, 95 of the three phases were sequentially increased from W-phase (see FIG. 13), and the overall dimension of protrusion L1 of the coil end parts 932, 942, 952 in the winding coils 93, 94, 95 of the three phases was approximately 37.5 mm.

These results show that according to the three-phase motor 1 of the invention (example 2), the overall dimension of protrusion L1 of the coil end parts 312, 412, 512 in the winding coils 3, 4, 5 of the three phases can be reduced to an optimal dimension.

Thus, in the three-phase motor of this form of the invention, the stator is so devised that the average circumferential length of the unipolar coils in the winding coil of each phase is varied by phase, thus reducing the overall dimension of the coil end parts of the winding coils of the three phases. Moreover, the length of the neutral point side lead part of the winding coil of each phase is varied by phase in the reverse manner of the average circumferential length, thus reducing the problem due to the variance of the average circumferential length.

That is, in this invention, with respect to the average circumferential length of the unipolar coils in the winding coils of the three phases, the average circumferential length in the winding coil of V-phase is shorter than the average circumferential length in the winding coil of U-phase, and the average circumferential length in the winding coil of W-phase is shorter than the average circumferential length in the winding coil of V-phase.

The stator is formed by first inserting the winding coil of U-phase into the stator core, then inserting the winding coil of V-phase into the stator core and then inserting the winding coil of W-phase into the stator core. In the stator, the pair of insertion parts of the winding coil of each phase is offset by a predetermined number of slots each as they are inserted into the slots, and the pair of coil end parts of the winding coil of each phase protrudes from end parts in the axial direction of the stator core.

Meanwhile, after the pair of insertion parts of the winding coil of U-phase is inserted into the slots of the stator core, the pair of coil end parts of the winding coil of U-phase is deformed and shifted toward an outer circumferential side of the stator core in order for the winding coils of V-phase and W-phase to be inserted into the stator core. In this case, the average circumferential length of the unipolar coils in the winding coil of U-phase is the longest of all the average circumferential lengths in the winding coils of the three phases, as described above. Therefore, the pair coil end parts of the winding coil of U-phase can be easily and largely deformed and shifted toward the outer circumferential side of the stator core.

When the pair of insertion parts of the winding coil of V-phase is inserted into the slots of the stator core, the pair of coil end parts of the winding coil of V-phase is partly superposed on the inner circumferential side of the pair of coil end parts of the winding coil of U-phase.

After the pair of insertion parts of the winding coil of V-phase is inserted in the slots of the stator core, the pair of coil end parts of the winding coil of V-phase is deformed and shifted toward the outer circumferential side of the stator core in order for the winding coil of W-phase to be inserted into the stator core. In this case, the average circumferential length of the unipolar coils in the winding coil of V-phase is longer than the average circumferential length of the unipolar coils in the winding coil of W-phase, as described above. Therefore, the pair of coil end parts of the winding coil of V-phase can be easily deformed and shifted toward the outer circumferential side of the stator core.

When the pair of insertion parts of the winding coil of W-phase is inserted into the slots of the stator core, the pair of coil end parts of the winding coil of W-phase is partly superposed on the inner circumferential side of the pair of coil end parts of the winding coil of V-phase. The pair of coil end parts of the winding coil of W-phase is provided without being largely deformed or shifted.

The pair of coil end parts of the winding coil of U-phase may be deformed and shifted while inserting the winding coil of V-phase into the stator core. If possible, the pair of coil end parts of the winding coil of U-phase may be deformed and shifted before inserting the winding coil of U-phase into the stator core. The coil end parts of the winding coils of V-phase and W-phase can be deformed and shifted in a similar manner.

In this manner, the unipolar coils in the winding coil of U-phase, having the longest average circumferential length of all the average circumferential lengths in the winding coils of the three phases, are deformed and shifted most largely. The coil end parts of the winding coil of U-phase, having the longer average circumferential length than the average circumferential length in the winding coil of W-phase, are deformed and shifted. Then, the coil end parts of the winding coil of W-phase, having the shortest average circumferential length of all the average circumferential lengths in the winding coils of the three phases, are not deformed nor greatly shifted. Thus, the lengths of protrusion of the coil end parts in the winding coils of the three phases from the end parts in the axial direction of the stator core can be made as short and equal as possible. This enables reduction in the overall dimension of the coil end parts of the winding coils of the three phases.

In the invention, the state of forming the neutral point is properly devised so as to compensate for the difference in the average circumferential length of the unipolar coils between the winding coils of the three phases.

That is, the neutral point is formed by bundling the neutral point side lead parts situated at the end in the second direction, of the individual pairs of lead parts of the winding coils of the three phases, at a position where an offset by a predetermined angle in the second direction from the winding coil of U-phase is made.

Therefore, the lengths of the neutral point side lead parts of the winding coils of the three phases are varied in a different manner from the average circumferential lengths of the unipolar coils in the winding coils of the three phases. The neutral point side lead part of the winding coil of V-phase is longer than the neutral point side lead part of the winding coil of U-phase, and the neutral point side lead part of the winding coil of W-phase is longer than the neutral point side lead part of the winding coil of V-phase.

Therefore, the difference in the average circumferential length of the unipolar coils between the winding coils of the three phases can be compensated by the lengths of the neutral point side lead parts of the winding coils of the three phases. This can minimize the difference in the total length of the electric wires forming the winding coils of the three phases.

As a result, the three-phase motor having the above-described stator, the difference in the conductor resistance in the winding coils of the three phases can be minimized and the overall dimension of the coil end parts of the winding coils of the three phases can be reduced.

Example 3

In this example, by the amount of the difference in the length between the neutral point side lead parts 32, 42, 52 in the winding coils 3, 4, 5 of the three phases, the average circumferential lengths of the unipolar coils 31, 41, 51 in the winding coils 3, 4, 5 of the three phases are varied in the reverse manner. To realize this, in this example, the average circumferential length of the unipolar coils 41 in the winding coil 4 of V-phase and the average circumferential length of the unipolar coils 51 in the winding coil 5 of W-phase were decided on the basis of the following relational equations Lv and Lw. That is, the relational equation Lv is expressed as $Lv=(S*Lu*n*m-2*\pi*R*Sv)/(S*n*m)$. The relational equation Lw is expressed as $Lw=(S*Lu*n*m-2*\pi*R*Sw)/(S*n*m)$.

In this case, Lu represents the average circumferential length of the unipolar coils 31 in the winding coil 3 of U-phase, Lv represents the average circumferential length of the unipolar coils 41 in the winding coil 4 of V-phase, and Lw represents the average circumferential length of the unipolar coils 51 in the winding coil 5 of W-phase. Lv and Lw are decided on the basis of Lu.

In the above-described equations, n represents the number of turns of each of the unipolar coils 31, 41 or 51 in the winding coil 3, 4 or 5 of each phase, and m represents the number of poles of the unipolar coils 31, 41, 51 in the winding coil 3, 4 or 5 of each phase. The numbers of turns of the unipolar coils 31, 41, 51 in the winding coils 3, 4, 5 of the three phases are the same, and the numbers of poles of the unipolar coils 31, 41, 51 in the winding coils 3, 4, 5 of the three phases are also the same.

In the above-described equations, π (pi) represents the ratio of the circumference of a circle to its diameter, and R represents the radius from the center O of the stator core 21 to the center in the radial direction of the slot 211 (average radius of the stator core 21; see FIG. 8). Further, S represents the total number of slots in the stator core 21, and Sv represents the number of the slots 211 by which the winding coil 4 of V-phase is offset from the winding coil 3 of U-phase in the first direction C1 of the stator core 21. In this example, the winding coil 4 of V-phase is offset from the winding coil 3 of U-phase by four slots in the first direction C1 as it is inserted in the stator core 21, and Sv is set at Sv=4 (see FIG. 3).

In the above-described equations, Sw represents the number of slots 211 by which the winding coil 5 of W-phase is offset from the winding coil 3 of U-phase in the first direction C1 of the stator core 21. In this example, the winding coil 5 of W-phase is offset from the winding coil 3 of U-phase by eight slots in the first direction C1 as it is inserted in the stator core 21, and Sw is set at Sw=8 (see FIG. 3).

Figure 11:
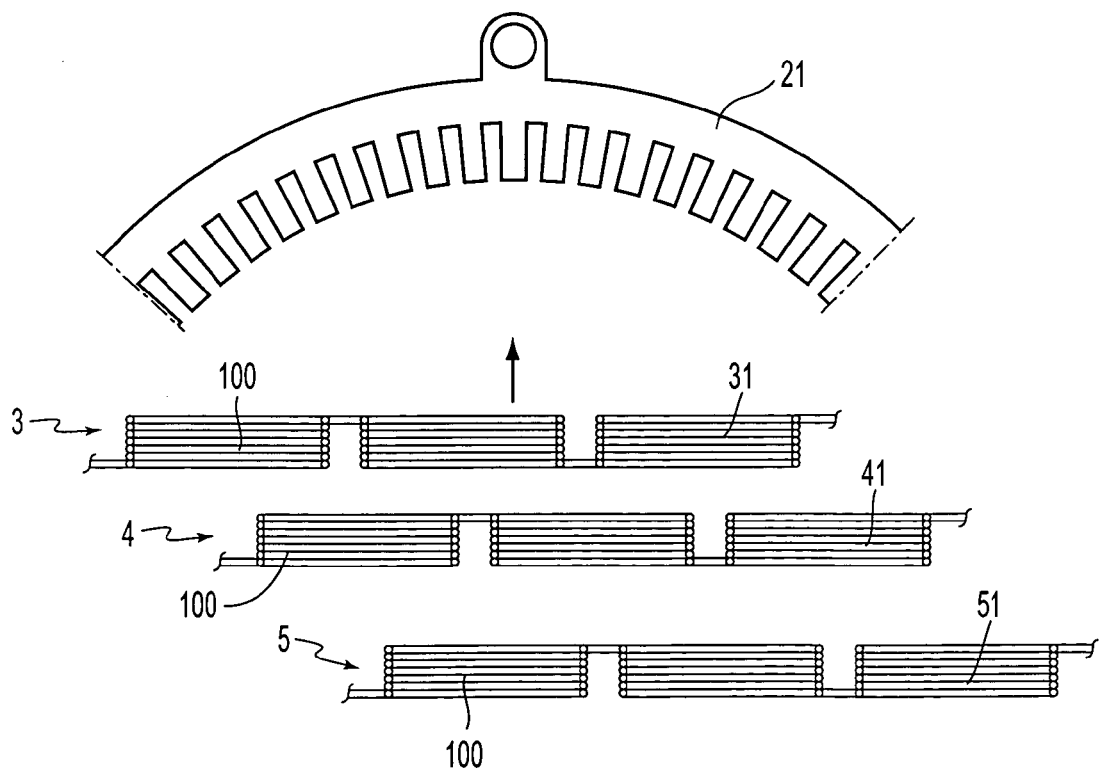
FIG. 11 is an explanatory view showing a state at the time of inserting winding coils of U-phase, V-phase and W-phase into a stator core in Example 3, as viewed from an end part in the axial direction of the stator core.

As shown in FIG. 11, in this example, the unipolar coils 31, 41, 51 in the winding coils 3, 4, 5 of the three phases are straight unipolar coils 31, 41, 51 formed by winding the electric wires 100 with substantially the same circumferential length.

As the circumferential lengths of the unipolar coils 31, 41, 51 in the winding coils 3, 4, 5 of the three phases are varied in the reverse manner of the neutral point side lead parts 32, 42, 52 in the winding coils 3, 4, 5 of the three phases by the amount of difference in the length between the neutral point side lead parts 32, 42, 52, as in this example, the total lengths of the electric wires 100 forming the winding coils 3, 4, 5 of the three phases can be substantially equalized and the conductor resistance in the winding coils 3, 4, 5 of the three phases can be substantially equalized.

Therefore, according to this example, the conductor resistance in the winding coils 3, 4, 5 of the three phases are substantially equalized, and the overall dimension of protrusion L1 of the coil end parts 312, 412, 512 in the winding coils 3, 4, 5 of the three phases can be reduced to an optimal dimension.

The other parts of this example are similar to those of the above-described Example 1, and effects similar to the effects of Example 1 can be achieved.

What is claimed is:

1. A three-phase motor having a stator formed by sequentially inserting winding coils of three phases of U-phase, V-phase and W-phase into slots provided on an inner circumferential surface of a stator core,
   wherein the winding coil of each phase is formed by connecting plural unipolar coils formed by winding electric wires in plural turns, and each of the unipolar coils includes a pair of insertion parts to be inserted into the slots and a pair of coil end parts connecting the pair of insertion parts, and
   the winding coils of the three phases have the relationships of Cv/Cu <1.0 and Cw/Cv <1.0, where Cu represents an average length of the electric wires forming the coil end parts of each of the unipolar coils in the winding coil of U-phase, Cv represents an average length of the electric wires forming the coil end parts of each of the unipolar coils in the winding coil of V-phase, and Cw represents an average length of the electric wires forming the coil end parts of each of the unipolar coils in the winding coil of W-phase.

2. The three-phase motor as claimed in claim 1, wherein the pair of insertion parts of each unipolar coil of U-phase is inserted in the slots, with an insertion part of the pair of insertion parts inserted into an appropriate slot, and the pair of coil end parts of the each unipolar coil of U-phase protrudes from the end parts in the axial direction of the stator core, and
   the pair of insertion parts of the each unipolar coil of V-phase is offset from a corresponding unipolar coil of U-phase by a predetermined number of slots in one circumferential direction of the stator core as the pair of insertion parts are inserted in the slots, and the pair of coil end parts of the unipolar coils of V-phase are partly superposed on the inner circumferential side of the pair of coil end parts of the unipolar coils of U-phase, and
   the pair of insertion parts of the each unipolar coil of W-phase is offset from a corresponding unipolar coil of V-phase by a predetermined number of slots in the one circumferential direction of the stator core as the pair of insertion parts are inserted in the slots, and the pair of coil end parts of the unipolar coils of W-phase are partly superposed on the inner circumferential side of the pair of coil end parts of the unipolar coils of V-phase.

3. The three-phase motor as claimed in claim 2, wherein the ratio Cv/Cu and the ratio Cw/Cv are substantially equal.

4. The three-phase motor as claimed in claim 3, wherein the circumferential length of the electric wires forming the unipolar coils of at least one of the winding coils of the three phases becomes shorter toward the outer circumferential side of the stator core.

5. The three-phase motor as claimed in claim 4, wherein with respect to the rate of change of the circumferential length of the unipolar coils, the rate of change in the unipolar coils of U-phase is higher than the rate of change in the unipolar coils of V-phase, and that the rate of change in the unipolar coils of V-phase is higher than the rate of change in the unipolar coils of W-phase.

6. The three-phase motor as claimed in claim 2, wherein the circumferential length of the electric wires forming the unipolar coils of at least one of the winding coils of the three phases becomes shorter toward the outer circumferential side of the stator core.

7. The three-phase motor as claimed in claim 6, wherein with respect to the rate of change of the circumferential length of the electric wires, the rate of change in the unipolar coils of U-phase is higher than the rate of change in the unipolar coils of V-phase, and that the rate of change in the unipolar coils of V-phase is higher than the rate of change in the unipolar coils of W-phase.

8. The three-phase motor as claimed in claim 1, wherein the ratio Cv/Cu and the ratio Cw/Cv are substantially equal.

9. The three-phase motor as claimed in claim 8, wherein the circumferential length of the electric wires forming the unipolar coils of at least one of the winding coils of the three phases becomes shorter toward the outer circumferential side of the stator core.

10. The three-phase motor as claimed in claim 9, wherein, with respect to the rate of change of the circumferential length of the electric wires, the rate of change in the unipolar coils of U-phase is higher than the rate of change in the unipolar coils of V-phase, and that the rate of change in the unipolar coils of V-phase is higher than the rate of change in the unipolar coils of W-phase.

11. The three-phase motor as claimed in claim 1, wherein the circumferential length of the electric wires forming the unipolar coils of at least one of the winding coils of the three phases becomes shorter toward the outer circumferential side of the stator core.

12. The three-phase motor as claimed in claim 1, wherein Cv/Cu=0.88 to 0.98 and Cw/Cv=0.88 to 0.98.

13. The three-phase motor as claimed in claim 12, wherein Cv/Cu=0.90 to 0.95 and Cw/Cv=0.90 to 0.95.

14. A three-phase motor having a stator formed by inserting winding coils of three phases of U-phase, V-phase and W-phase into slots provided on an inner circumferential surface of a stator core, wherein the winding coil of each phase has plural unipolar coils formed by winding electric wires in plural turns, a connecting wire for connecting the unipolar coils, and a pair of lead parts formed by leading out the electric wires from unipolar coils situated at both ends of each of the plurality of winding coils, and each of the unipolar coils includes a pair of insertion parts to be inserted into the slots and a pair of coil end parts connecting the pair of insertion parts, and with respect to average circumferential lengths of the unipolar coils in the winding coils of the three phases, the average circumferential length in the unipolar coils of V-phase is shorter than the average circumferential length in the unipolar coils of U-phase, and the average circumferential length in the unipolar coils of W-phase is shorter than the average circumferential length in the unipolar coils of V-phase, and the pair of insertion parts of the unipolar coils of U-phase are inserted in the slots and the pair of coil end parts of the winding coils of U-phase protrude from end parts in an axial direction of the stator core, and the pair of insertion parts of the unipolar coils of V-phase are offset from the unipolar coils of U-phase by a predetermined number of slots in a first direction, which is one circumferential direction of the stator core, as they are inserted in the slots, and the pair of coil end parts of the unipolar coils of V-phase are partly superposed on an inner circumferential side of the pair of coil end parts of the unipolar coils of U-phase, and the pair of insertion parts of the unipolar coils coil of W-phase are offset from the unipolar coils of V-phase by a predetermined number of slots in the first direction of the stator core as they are inserted in the slots, and the pair of coil end parts of the unipolar coils of W-phase are partly superposed on an inner circumferential side of the pair of coil end parts of the unipolar coils of V-phase.

15. The three-phase motor as claimed in claim 14, wherein, of the pair of lead parts of the winding coil of each phase, the lead part situated at an end part in a second direction, which is opposite to the first direction of the stator core, is used as a neutral point side lead part, and the neutral point side lead parts of the winding coils of the three phases are bundled to form a neutral point at a position where an offset from the winding coil of U-phase by a predetermined angle in the second direction is made, so that the neutral point side lead part of the winding coil of V-phase is longer than the neutral point side lead part of the winding coil of U-phase, and the neutral point side lead part of the winding coil of W-phase is longer than the neutral point side lead part of the winding coil of V-phase.

16. The three-phase motor as claimed in claim 14, wherein an average circumferential length Lv of the unipolar coils in the winding coil of V-phase and an average circumferential length Lw of the unipolar coils in the winding coil of W-phase satisfy the following relational equations:

$$Lv=(S*Lu*n*m-2*\pi*R*Sv)/(S*n*m) \text{ and}$$

$$Lw=(S*Lu*n*m-2*\pi*R*Sw)/(S*n*m)$$

where Lu represents the average circumferential length of the unipolar coils in the winding coil of U-phase, n represents the number of turns of each unipolar coil in the winding coil of each phase, m represents the number of poles of the unipolar coils in the winding coil of each phase, $\pi$(pi) represents the ratio of the circumference of a circle to its diameter, R represents the radius from the center of the stator core to the center in the radial direction of the slot, S represents the total number of slots in the stator core, Sv represents the number of slots by which the unipolar coils of V-phase are offset from the unipolar coils of U-phase in the first direction of the stator core, and Sw represents the number of slots by which the unipolar coils of W-phase are offset from the unipolar coils of U-phase in the first direction of the stator core.

17. The three-phase motor as claimed in claim 16, wherein the circumferential length of the electric wires forming the unipolar coils in the winding coils of U-phase and V-phase becomes shorter toward the outer circumferential side of the stator core.

18. The three-phase motor as claimed in claim 17, wherein with respect to the rates of change of the circumferential length of the electric wires, the rate of change in the unipolar coils of U-phase is higher than the rate of change in the unipolar coils of V-phase.

19. The three-phase motor as claimed in claim 14, wherein the circumferential length of the electric wires forming the unipolar coils in the winding coils of U-phase and V-phase becomes shorter toward the outer circumferential side of the stator core.

20. The three-phase motor as claimed in claim 19, wherein with respect to the rates of change of the circumferential length of the electric wires, the rate of change in the unipolar coils of U-phase is higher than the rate of change in the unipolar coils of V-phase.

* * * * *